(12) United States Patent
Agarwal et al.

(10) Patent No.: US 11,919,526 B1
(45) Date of Patent: Mar. 5, 2024

(54) MODEL-BASED VEHICLE DRIVE SYSTEM MONITORS

(71) Applicant: Zoox, Inc., Foster City, CA (US)

(72) Inventors: Kshitij Agarwal, Redwood City, CA (US); David Martins Belo, San Francisco, CA (US); Michael Isaac Mizrahi, San Mateo, CA (US); Matthew Nathaniel Dickerson, San Francisco, CA (US)

(73) Assignee: ZOOX, INC., Foster City, CA (US)

(*) Notice: Subject to any disclaimer, the term of this patent is extended or adjusted under 35 U.S.C. 154(b) by 267 days.

(21) Appl. No.: 17/243,407

(22) Filed: Apr. 28, 2021

(51) Int. Cl.
*B60W 50/02* (2012.01)
*B60W 50/00* (2006.01)

(52) U.S. Cl.
CPC .... *B60W 50/0205* (2013.01); *B60W 50/0097* (2013.01); *B60W 2510/083* (2013.01); *B60W 2510/18* (2013.01); *B60W 2510/20* (2013.01)

(58) Field of Classification Search
CPC ........ B60W 50/0205; B60W 50/0097; B60W 2510/083; B60W 2510/18; B60W 2510/20
See application file for complete search history.

(56) References Cited

U.S. PATENT DOCUMENTS

| 2016/0355252 | A1* | 12/2016 | Straub | B64G 1/36 |
| 2017/0371347 | A1* | 12/2017 | Cohen | G06T 7/277 |
| 2018/0148069 | A1* | 5/2018 | Yucelen | G05D 1/0088 |
| 2019/0113916 | A1* | 4/2019 | Guo | B60W 50/02 |
| 2019/0118829 | A1* | 4/2019 | Goldberg | B60W 30/18 |
| 2019/0256064 | A1* | 8/2019 | Hecker | B60W 50/0205 |
| 2019/0344799 | A1* | 11/2019 | Tiwari | B60W 60/0015 |
| 2020/0001912 | A1* | 1/2020 | Abuaita | B62D 5/0481 |
| 2020/0031297 | A1* | 1/2020 | Foltin | B60W 50/029 |
| 2020/0239067 | A1* | 7/2020 | Wu | B62D 15/025 |
| 2020/0363816 | A1* | 11/2020 | Zuo | B60W 40/105 |
| 2020/0406869 | A1* | 12/2020 | Hwang | B60T 17/22 |
| 2021/0323564 | A1* | 10/2021 | Wang | B62D 6/002 |
| 2021/0403013 | A1* | 12/2021 | Jung | B60W 60/0059 |
| 2022/0200843 | A1* | 6/2022 | Thor | H04L 67/535 |
| 2022/0219537 | A1* | 7/2022 | Lutz | B60K 35/00 |
| 2022/0297645 | A1* | 9/2022 | Yanagida | B60T 13/662 |
| 2023/0018500 | A1* | 1/2023 | Zhao | B60W 30/188 |

FOREIGN PATENT DOCUMENTS

CN 110334312 A * 10/2019 ............. G06F 17/11

* cited by examiner

*Primary Examiner* — Amelia Vorce
(74) *Attorney, Agent, or Firm* — Lee & Hayes P.C.

(57) ABSTRACT

Techniques are discussed herein for detecting and measuring faults within vehicle drive systems. In various implementations, actuator feedback monitors and/or vehicle performance monitors are used individually or in combination to determine faults within acceleration systems, braking systems, and/or steering systems of a vehicle. Different monitors may use different algorithms, models, and input data from the vehicle during operation, to compare a predicted drive system output to a corresponding measured output. Additionally, monitors may include associated sets of disable conditions used to distinguish drive system faults from other driving conditions. The outputs from actuator feedback monitors, vehicle performance monitors, and disable conditions may be analyzed to detect drive system faults and control the vehicle to address the faults and control the safe operation of the vehicle.

20 Claims, 10 Drawing Sheets

MODEL-BASED VEHICLE DRIVE SYSTEM MONITORS

BACKGROUND

Vehicles may include controllers and drive systems configured to implement vehicle operations such as propulsion, friction braking, and torque steering, among others. Detecting failures and errors within the vehicle drive systems may be critical to maintaining vehicle performance and assuring passenger safety. However, vehicle drive systems are often complex and dynamic systems, including electronic actuators used in combination with other mechanical, electromechanical, hydraulic, and/or electronic components to control the movement and operation of the vehicle, in response to control commands received via vehicle controllers. For instance, a vehicle propulsion system may include an engine, transmission, driveshafts, and differential systems, a steering system may include a steering motor and steering rack, and a braking system may include hydraulic and mechanical braking components. Each of these systems may have additional components and subcomponents which may be subject to failures, wear and tear, and potential errors or malfunctions. The operation of vehicle drive systems also may depend on additional vehicle systems such as suspensions and tires, and the performance of any or all of these systems may vary based on current driving conditions and vehicle operating states.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The techniques discussed herein relate to determining and analyzing faults within components of vehicle drive systems. As described in various examples below, monitoring systems including actuator feedback monitors and/or vehicle performance monitors may be used individually or in combination to detect faults (or errors) within vehicle drive systems and their related components. Different monitors may be implemented for vehicle acceleration systems, vehicle braking systems, vehicle steering systems, as well as any other component or subcomponent. Of course, the description herein is not meant to be so limiting and, in fact, one or more monitors may be associated with a plurality of such systems and subsystems. Monitors may use different combinations of models, algorithms, and input data to determine predicted drive system outputs, and compare the predicted outputs to actual received/measured outputs from the drive system. In some examples, actuator feedback monitors and vehicle performance monitors may be used in combination to analyze vehicle acceleration, braking, or steering systems. Additionally, the vehicle drive monitors described herein may include associated sets of monitor disable conditions, corresponding to internal vehicle states and/or external data received via the vehicle sensors. Monitor disable conditions may be used to avoid detection of false positives, by distinguishing drive system faults from other driving conditions. The outputs from the vehicle drive monitors may be analyzed in combination to detect drive system faults, and to perform vehicle operations such as system component reconfigurations, component bypasses, and/or automatic driving maneuvers such as initiating emergency safe stops, based on the detection of drive system faults.

Figure 1:
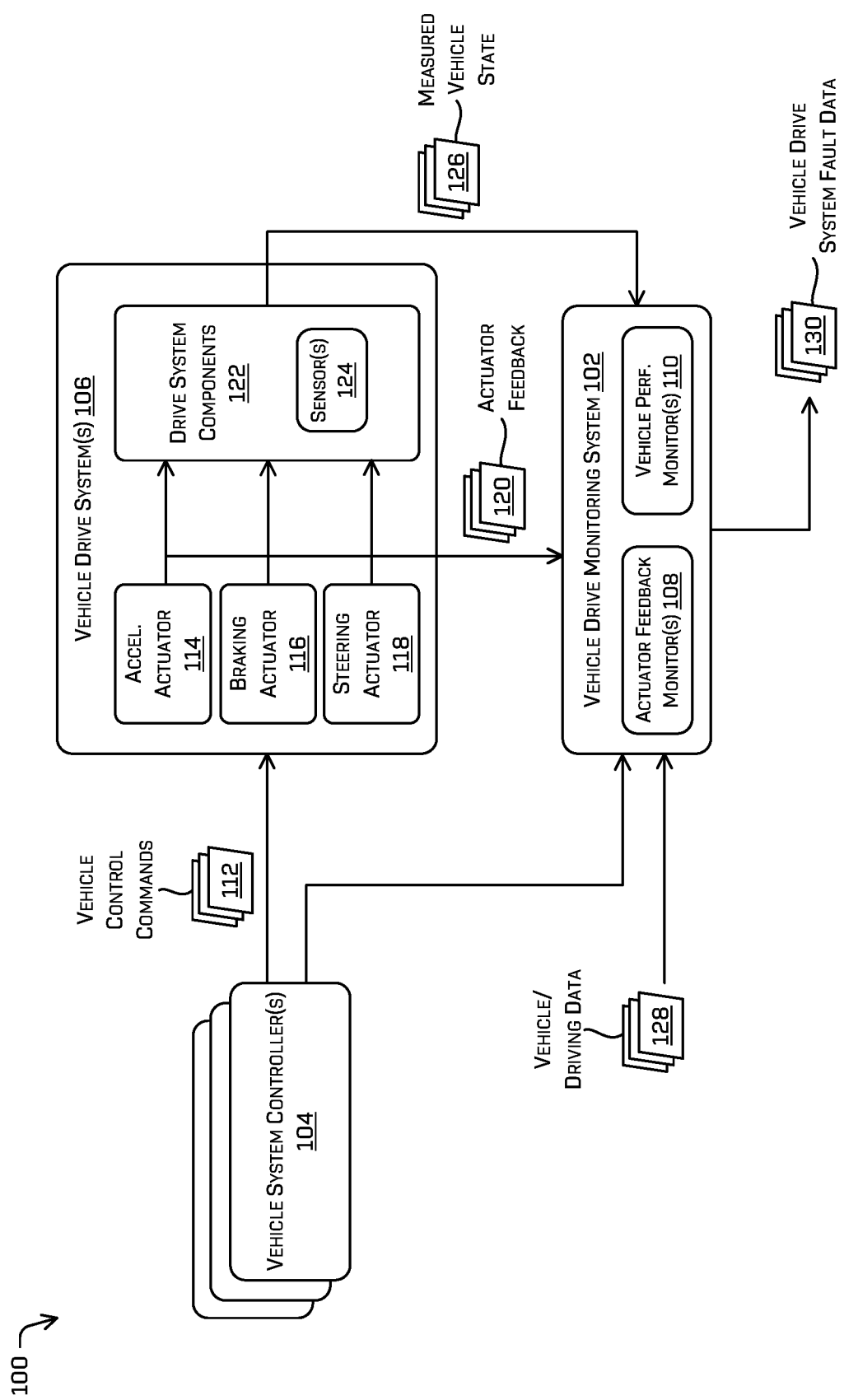
FIG. 1 illustrates components of an example system for determining vehicle drive system faults, in accordance with one or more implementations of the disclosure.

FIG. 1 depicts an example system 100, including a vehicle drive monitoring system 102 configured to operate on a vehicle and detect faults in the drive system components during the operation of the vehicle. In this example, the vehicle includes a number of vehicle system controller(s) 104 that determine operations and transmit corresponding vehicle control commands to the vehicle drive system(s) 106, including systems such as a propulsion, braking, and/or steering systems capable of controlling the movement and operation of the vehicle. The vehicle drive monitor system 102 in this example includes actuator feedback monitor(s) 108 and vehicle performance monitor(s) 110, each of which may be configured to receive vehicle control commands 112 from the vehicle system controller(s) 104, and to predict outputs of the vehicle drive system(s) 106 based on the vehicle control commands 112.

The actuator feedback monitor(s) 108 may be configured to generate predicted actuator feedback values based on the vehicle control commands 112, and compare the predicted actuator feedback values to actuator feedback data received from actuators within the vehicle drive system(s) 106. Within a vehicle implementing a drive system fault detection system, such as system 100, the vehicle system controller(s) 104 may transmit commands to control actuators within the vehicle drive system(s) 106, causing the actuators to control the various drive system components. In this example, the vehicle drive system(s) 106 includes a drive motor actuator 114, a friction brake actuator 116, and a steering actuator 118. The vehicle system controller(s) 104 may be coupled to the actuators 114-118 with or without use of a network, and using a unidirectional coupling or a bidirectional coupling based on criteria (e.g., bandwidth requirements, hardware limitations, etc.) of the various components of the vehicle. Although three actuators 114-118 are shown in this example, any number of actuators, which may be implemented using electronic drive units (EDUs), may be used in other examples.

Based on commands received the from vehicle system controller(s) 104, the actuators 114-118 control (e.g., drive, regulate, actuate, etc.) the drive system components 122 of the vehicle drive system(s) 106. For example, the drive motor actuator 114 may control the output of torque to an electric motor of the vehicle, the friction brake actuator 116 may control the output of torque to a hydraulic braking system of the vehicle, and the steering actuator 118 may control the rack position within the steering system. Additionally, the actuators 114-118 may be configured to provide feedback relating to the component(s) being actuated by the actuator. For example, the drive motor actuator 114 may provide an estimated torque feedback corresponding to the amount of torque provided to the electric motor, the friction brake actuator 116 may provide an estimated torque feedback corresponding to the amount of torque provided to the hydraulic braking system, and the steering actuator 118 may provide steering rack position feedback.

The actuator feedback monitor(s) 108 are configured to predict the feedback data produced by the actuators 114-118, based on the vehicle control commands 112 provided to the actuators. The actuator feedback monitor(s) 108 then may compare the predicted feedback data to the actual (or measured) feedback data received from the actuators 114-118. In some examples, the actuator feedback monitor(s) 108 may receive the actuator feedback data directly from the actuators 114-118, or indirectly via the vehicle system controller(s) 104. For various reasons, the vehicle control command 112 (e.g., a command signal corresponding to a requested torque or steering rack position) provided to an actuator might not match the feedback data received from the actuator during the same or a corresponding time period within the signal. For instance, data communication or processing within the system may cause latencies (e.g., time delays) between the controllers, actuators, and monitors. Additionally, certain actuator functions may include time lags between the command signals and feedback signals of provided by the actuator. For instance, actuator feedback based on torque commands provided to actuators 114 and 116 may lag due to higher-order dynamics and/or non-linearities affecting the torque feedback. Discrepancies between the control commands/signals provided to the actuators 114-118 and the feedback received from the actuators 114-118 can also be caused by errors or malfunctions within the actuators 114-118 themselves, and/or within the additional drive system components 122 within the vehicle drive system(s) 106. As described in more detail below, the actuator feedback monitor(s) 108 may apply various actuator feedback models using low-pass filters, rate limiters, and other transfer functions to predict the estimated feedback of actuators 114-118 based on the corresponding vehicle control commands 112 provided to the actuators 114-118. When the difference between the estimated actuator feedback determined by an actuator feedback model, and the measured actuator feedback, exceeds a threshold amount, the actuator feedback monitor(s) 108 may determine that the difference is based on a fault within the actuator and/or the additional electrical components of the vehicle drive system(s) 106.

Vehicle performance monitor(s) 110 may be used separately and/or in conjunction with the actuator feedback monitor(s) 108. In contrast to the actuator feedback monitor(s) 108, the vehicle performance monitor(s) 110 may be configured to generate the predicted responses of the vehicle drive system(s) 106 as a whole (e.g., measured vehicle accelerations, decelerations, steering changes, etc.) based on the vehicle control commands 112 and/or other input data. As described below, the vehicle performance monitor(s) 110 may use various different vehicle state models and/or algorithms to predict changes in vehicle states (e.g., vehicle positions, poses, velocities, accelerations, etc.) resulting from vehicle control commands provided by the system controllers to the vehicle actuator(s). For instance, one or more model(s) within a vehicle performance monitor 110 may include a vehicle acceleration model that predicts the vehicle accelerations that will result from various acceleration commands provided to the drive motor actuator 114, a friction braking measurement model that predicts the vehicle decelerations that will result from the braking commands provided to the friction brake actuator 116, and a vehicle steering model that predicts changes in the vehicle steering (e.g., steering rack position) that will result from the steering commands provided to the steering actuator 118. In some cases, the vehicle performance monitor(s) 110 may use feedback from the actuators and/or vehicle/driving data 128 as additional input to predict the vehicle states (e.g., responses) to control commands. For instance, vehicle/driving data 128 may include the current state of the vehicle (e.g., vehicle weight, occupancy, current tire pressure, component temperature(s), vehicle component age and wear, etc.), the current driving and road condition data (e.g., current speed, road surface and conditions, etc.), the current weather and temperature data, and the like.

After using one or more vehicle state models and/or algorithms, described in more detail below, to predict the vehicle's response to a vehicle control command 112, the vehicle performance monitor(s) 110 may compare the predicted vehicle state to the measured vehicle state 126 received from the vehicle drive system(s). For example, after an acceleration command is provided to the drive motor actuator 114, a vehicle performance monitor 110 may calculate a predicted vehicle acceleration based on the command, and may compare the predicted vehicle acceleration to an actual measured vehicle acceleration. Similarly, the vehicle performance monitor 110 may predict the deceleration based on a braking command provided to the friction brake actuator 116 and compare the predicted deceleration to a measured vehicle deceleration, and/or may predict an updated steering rack position based on a steering command provided to the steering actuator 118 and compare the predicted steering rack position to a measured steering rack position of the vehicle. As shown in this example, the vehicle performance monitor(s) 110 may receive the measured vehicle state 126 from the vehicle drive system(s) 106. For instance, the vehicle drive system(s) 106 may include one or more sensor(s) 124, such as inertial monitoring units (IMUs) and/or other sensor systems configured to measure and transmit acceleration, deceleration, and yaw data for the vehicle to the vehicle performance monitor(s) 110. In other examples, the measured vehicle state data (e.g., vehicle speeds, accelerations, decelerations, yaw rates, steering rack positions, etc.) may be received from other sensor systems within the vehicle, within or external to the vehicle drive system(s) 106, and/or other sensors or vehicle movement data captured externally to the vehicle.

Based on the differences between the model-based predicted outputs and the corresponding observed/measured data received from the vehicle drive system(s) 106, the actuator feedback monitor(s) 108 and/or vehicle performance monitor(s) 110 may determine and output vehicle drive system fault data 130. The vehicle drive system fault data 130 may include the type of the fault, such as a failure to sufficiently perform an acceleration or deceleration command from a vehicle system controller 104, or performing unintended acceleration or deceleration that exceeded the command from the vehicle system controller 104, or setting the steering rack position to an angle greater or lesser than the command from the vehicle system controller 104. Additionally, the vehicle drive system fault data 130 also may include the magnitude of the fault (e.g., N degrees steering rack position fault, N m/s$^2$ acceleration or deceleration fault, etc.), as well as the time duration of the fault. As described below, the fault type, magnitude, and/or time duration may be used to determine operations to be performed on the vehicle to address or remediate the drive system faults. In some examples, a drive system fault of a sufficient magnitude and duration may cause the vehicle to initiate an emergency stop operation. As another example, a drive system fault of a lesser magnitude and/or duration may be addressed by bypassing or reconfiguring components within the vehicle drive system(s) 106. Additionally or alternatively, the vehicle drive system fault data 130 may be transmitted to the vehicle system controller(s) 104 and/or other vehicle components, which may be configured to compensate for the fault by change modifying subsequent vehicle control commands 112 that are provided to the vehicle drive system(s) 106.

In some cases, fault detection monitors may be associated with disable conditions. A disable condition for a monitor may include a set of conditions, such as (but not limited to) vehicle states, road conditions, ranges of values from vehicle sensor systems, and the like. Monitor disable conditions may be used to distinguish actual faults within drive system components from other false positive conditions during which the data received from the drive system may deviate from the model-based predictions. Different disable conditions may be used for different types of monitors, such as actuator feedback monitors and vehicle performance monitors, as well as for different vehicle control commands/drive system functionality (e.g., acceleration, braking, and steering). For instance, an actuator feedback monitor associated with a drive motor actuator 114 may have one set of disable conditions (e.g., clutch engagement), while an actuator feedback monitor associated with a friction brake actuator 116 may have a different set of disable conditions (e.g., ABS engagement), and an actuator feedback monitor associated with a steering actuator 118 may have a still different set of disable conditions (e.g., electronic stability control (ESC) system engagement). Additionally, an actuator feedback monitor for a drive motor actuator 114 may use different disable conditions than the vehicle performance monitor used for acceleration commands from the vehicle system controller(s) 104. When a disable condition occurs for an actuator feedback monitor or a vehicle performance monitor, the monitor may be disabled, for example, by not executing the monitor and/or by disregarding any fault data determined by the monitor.

The techniques described herein include using both actuator feedback monitor(s) 108 and/or vehicle performance monitor(s) 110 to detect faults in the components of the vehicle drive system(s) 106. In some examples, actuator feedback monitor(s) 108 may be separately executed and evaluated, or vehicle performance monitor(s) 110 may be separately executed and evaluated. In other examples, actuator feedback monitor(s) 108 may be used in conjunction with vehicle performance monitor(s) 110 to provide more accurate and detailed data for potential drive system faults. As described below, combining use of actuator feedback monitor(s) 108 and vehicle performance monitor(s) 110 to detect and evaluate drive system faults may provide advantages over conventional systems used to detect drive system faults.

Actuator feedback monitor(s) 108 may execute relatively quickly and may provide more precise fault data, because the fault data is based on the feedback data output directly by the actuators 114-118. However, fault data based on actuator feedback monitor(s) 108 may provide a lesser degree of assurance in some cases, because the data from which the faults are inferred is produced by the same components being evaluated, and thus errors or failures within the actuators 114-118 may cause unreliable feedback data. In contrast, vehicle performance monitor(s) 110 may provide a relatively greater degree of assurance (or confidence) when drive system faults are detected, and also may provide relatively greater accuracy when determining the effect of the faults on the vehicle as a whole. For instance, the fault effects measured by the vehicle performance monitor(s) 110 may take into account the current vehicle speed, weight, road conditions, component temperature and wear, and the like. However, in some cases the vehicle performance monitor(s) 110 may take longer to execute and determine faults, and may be susceptible to false positive caused by factors unrelated to the vehicle drive system(s) 106 (e.g., changes in road gradient, potholes, wind gusts, etc.).

Accordingly, examples that implement a combination of actuator feedback monitor(s) 108 and vehicle performance monitor(s) 110 may provide technical advantages and improvements in diagnosing and measuring faults within vehicle drive system(s) 106. Combined monitoring systems such as the vehicle drive monitor system 102 may provide earlier fault detection with the higher-speed actuator feedback monitor(s) 108, as well as higher assurance fault detection with the independent evaluation of the vehicle performance monitor(s) 110. Additionally, the use of both actuator feedback monitor(s) 108 and vehicle performance monitor(s) 110 allows the vehicle drive monitor system 102 to more quickly identify false positive and/or false negative faults detected by one or both monitoring systems. Further, by using both actuator feedback monitor(s) 108 and vehicle performance monitor(s) 110 to perform and verify fault detection in the vehicle drive system(s) 106, the fault data may be more accurate with respect to magnitude and time duration, which can allow the vehicle to address the fault more quickly and initiate a more granular and tailored vehicle control response to the fault.

Figure 2:
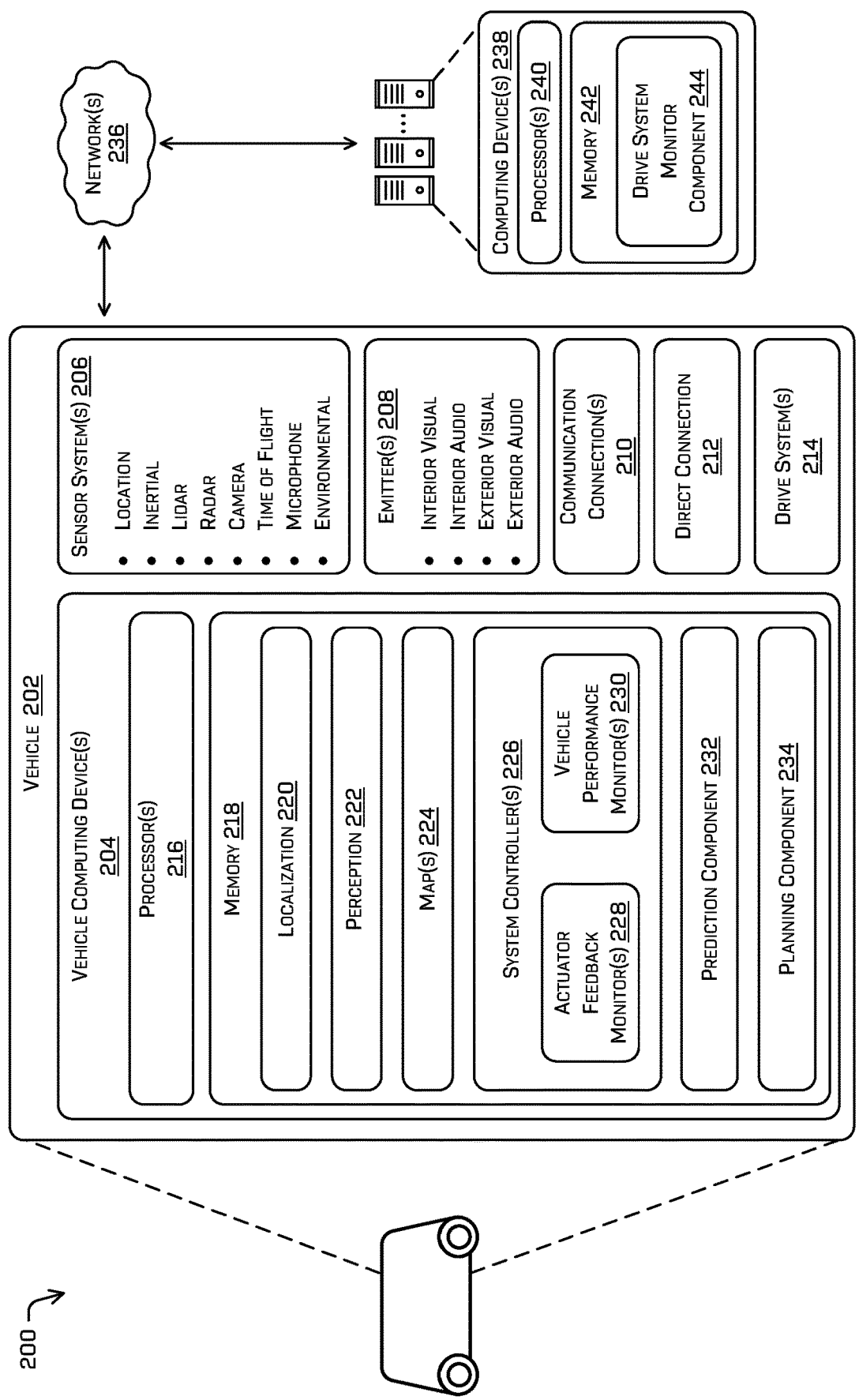
FIG. 2 depicts a block diagram of an example system for implementing various techniques described herein.

FIG. 2 depicts a block diagram of an example system 200 for implementing various techniques described herein. In at least one example, the system 200 can include a vehicle 202, which can correspond to an autonomous or semi-autonomous vehicle configured to perform object perception and prediction functionality, route planning and/or optimization. As described below, the vehicle 202 may include components configured to implement a drive system fault detection system, such as system 100 described above. The example vehicle 202 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 can be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 202 can include vehicle computing device(s) 204, one or more sensor systems 206, one or more emitters 208, one or more communication connections 210, at least one direct connection 212, and one or more drive systems 214.

The vehicle computing device(s) 204 can include one or more processors 216 and memory 218 communicatively coupled with the one or more processors 216. In the illustrated example, the vehicle 202 is an autonomous vehicle; however, the vehicle 202 could be any other type of vehicle or robotic platform. In the illustrated example, the memory 218 of the vehicle computing device(s) 204 stores a localization component 220, a perception component 222, one or more maps 224, one or more system controllers 226, one or more actuator feedback monitors 228, one or more vehicle performance monitors 230, a prediction component 232, and a planning component 234. Though depicted in FIG. 2 as residing in the memory 218 for illustrative purposes, one or more of the localization component 220, the perception component 222, the maps 224, the system controllers 226, actuator feedback monitors 228, the vehicle performance monitors 230, the prediction component 232, and the planning component 234 can additionally, or alternatively, be accessible to the vehicle 202 (e.g., stored on, or otherwise accessible by, memory remote from the vehicle 202).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for determining that an object is proximate to one or more crosswalk regions and/or for identifying candidate reference lines, as discussed herein.

In some instances, and in general, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, stoplight, stop sign, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 218 can further include one or more maps 224 that can be used by the vehicle 202 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 224 can include at least one map (e.g., images and/or a mesh).

In some examples, the vehicle 202 can be controlled based at least in part on the maps 224. That is, the maps 224 can be used in connection with the localization component 220, the perception component 222, the prediction component 232, and/or the planning component 234 to determine a location of the vehicle 202, identify objects in an environment, and/or generate routes and/or trajectories to navigate within an environment.

In some examples, the one or more maps 224 can be stored on a remote computing device(s), such as within the map component 246 of the computing device(s) 238, and may be accessible to the vehicle 202 via network(s) 236. In some examples, multiple maps 224 can be retrieved from the map component 246, and stored based on, for example, a characteristic (e.g., type of entity, time of day, day of week, season of the year, etc.). Storing multiple maps 224 can have similar memory requirements, but can increase the speed at which data in a map can be accessed.

In at least one example, the vehicle computing device(s) 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202. In some examples, system controllers 226 may be similar or identical to the vehicle system controller(s) 104 described above. System controllers 226 may include a vehicle drive monitoring system 102 in some examples, and the actuator feedback monitor(s) 228 and vehicle performance monitor(s) 230 shown in this example may be similar or identical to the respective actuator feedback monitor(s) 108 and vehicle performance monitor(s) 110 described above. As shown in this example, the system controller(s) 226 may include any or all of the actuator feedback monitor(s) 228 and vehicle performance monitor(s) 230. In other examples, the actuator feedback monitor(s) 228 and/or vehicle performance monitor(s) 230 may be implemented elsewhere within the vehicle computing devices 204, within the drive system(s) 214, or in a separate component within the vehicle 202 or external computing device(s) 238.

In general, the prediction component 232 can include functionality to generate predicted information associated with objects in an environment. As an example, the prediction component 232 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 202 traverses an environment. In some examples, the prediction component 232 can generate one or more predicted positions, predicted velocities, predicted trajectories, etc., for such target objects based on attributes of the target object and/or other objects proximate the target object.

In general, the planning component 234 can determine a path for the vehicle 202 to follow to traverse the environment. For example, the planning component 234 can determine various routes and trajectories and various levels of detail. For example, the planning component 234 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 234 can generate an instruction for guiding the autonomous vehicle along at least a portion of the route from the first location to the second location. In at least one example, the planning component 234 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In some instances, the planning component 234 can generate one or more trajectories for the vehicle 202 based at least in part on predicted location(s) associated with object(s) in an environment. In some examples, the planning component 234 can use temporal logic, such as linear temporal logic and/or signal temporal logic, to evaluate one or more trajectories of the vehicle 202.

As can be understood, the components discussed herein (e.g., the localization component 220, the perception component 222, the one or more maps 224, the one or more system controllers 226, the actuator feedback monitors 228, the vehicle performance monitors 230, the prediction component 232, and the planning component 234) are described as divided for illustrative purposes. However, the operations performed by the various components can be combined or performed in any other component. Further, any of the components discussed as being implemented in software can be implemented in hardware, and vice versa. Further, any functionality implemented in the vehicle 202 can be implemented in the computing device(s) 238, or another component (and vice versa).

In at least one example, the sensor system(s) 206 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the time of flight sensors can include individual time of flight sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device(s) 204. Additionally or alternatively, the sensor system(s) 206 can send sensor data, via the one or more networks 236, to the one or more computing device(s) 238 at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device(s) 204 to another computing device or a network, such as network(s) 236. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In various examples, the drive system 214 may be similar or identical to the vehicle drive system(s) 106 described above. The vehicle 202 can have a single drive system 214, or multiple drive systems 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In at least one example, the localization component 220, the perception component 222, the one or more maps 224, the one or more system controllers 226, the actuator feedback monitors 228, the vehicle performance monitors 230, the prediction component 232, and the planning component 234 can process sensor data, as described above, and can send their respective outputs, over the one or more network(s) 236, to one or more computing device(s) 238. In at least one example, the respective outputs of the components can be transmitted the one or more computing device(s) 238 at a particular frequency, after a lapse of a predetermined period of time, in near real-time, etc. Additionally or alternatively, the vehicle 202 can send sensor data to one or more computing device(s) 238 via the network(s) 236, including raw sensor data, processed sensor data and/or representations of sensor data. Such sensor data can be sent as one or more log files to the computing device(s) 238 at a particular frequency, after a lapse of a predetermined period of time, in near real-time, etc.

The computing device(s) 238 can include processor(s) 240 and a memory 242 storing a drive system monitor component 244. In some instances, the drive system monitor component 244 can include functionality to determine drive system fault detection data, including models, algorithms, inputs, and/or thresholds to may be used the actuator feedback monitors 228 and/or vehicle performance monitors 230 (e.g., actuator feedback models and/or vehicle state models). Additionally, the drive system monitor component 244 may receive fault data from the vehicle 202, and evaluate the fault data to update the drive system fault detection data for the vehicle 202. For instance, actuator feedback models and/or vehicle state models may be updated based on changes to drive system components, thresholds may be updated based on vehicle wear, age, and mileage, and so on. The drive system monitor component 244 also may provide different drive system fault detection data to different vehicles 202, depending on the hardware and software specifications of the vehicles 202. Additionally or alternatively, the functionality of the drive system monitor component 244 to determine and maintain drive system fault detection data may be performed on the vehicle 202 (e.g., within the system controller(s) 226), and may be updated dynamically by the vehicle computing device(s) 204.

In various examples, the drive system monitor component 244 may implement one or more heuristics-based system and/or neural network models to determine and optimize the drive system fault detection data (e.g., models, algorithms, inputs, thresholds, etc.) used by the actuator feedback monitor(s) 228 and vehicle performance monitor(s) 230. For instance, neural networks may be trained to output algorithm parameters, thresholds, and the like, that minimize false positive and false negative drive system fault detections for specific vehicles 202. Neural networks are algorithms which pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Any type of machine learning can be used consistent with this disclosure.

The processor(s) 216 of the vehicle 202 and the processor(s) 240 of the computing device(s) 238 can be any suitable processor capable of executing instructions to process data and perform operations as described herein. By way of example and not limitation, the processor(s) 216 and 240 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 242 are examples of non-transitory computer-readable media. The memory 218 and 242 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 238 and/or components of the computing device(s) 238 can be associated with the vehicle 202. That is, the vehicle 202 can perform one or more of the functions associated with the computing device(s) 238, and vice versa.

Figure 3:
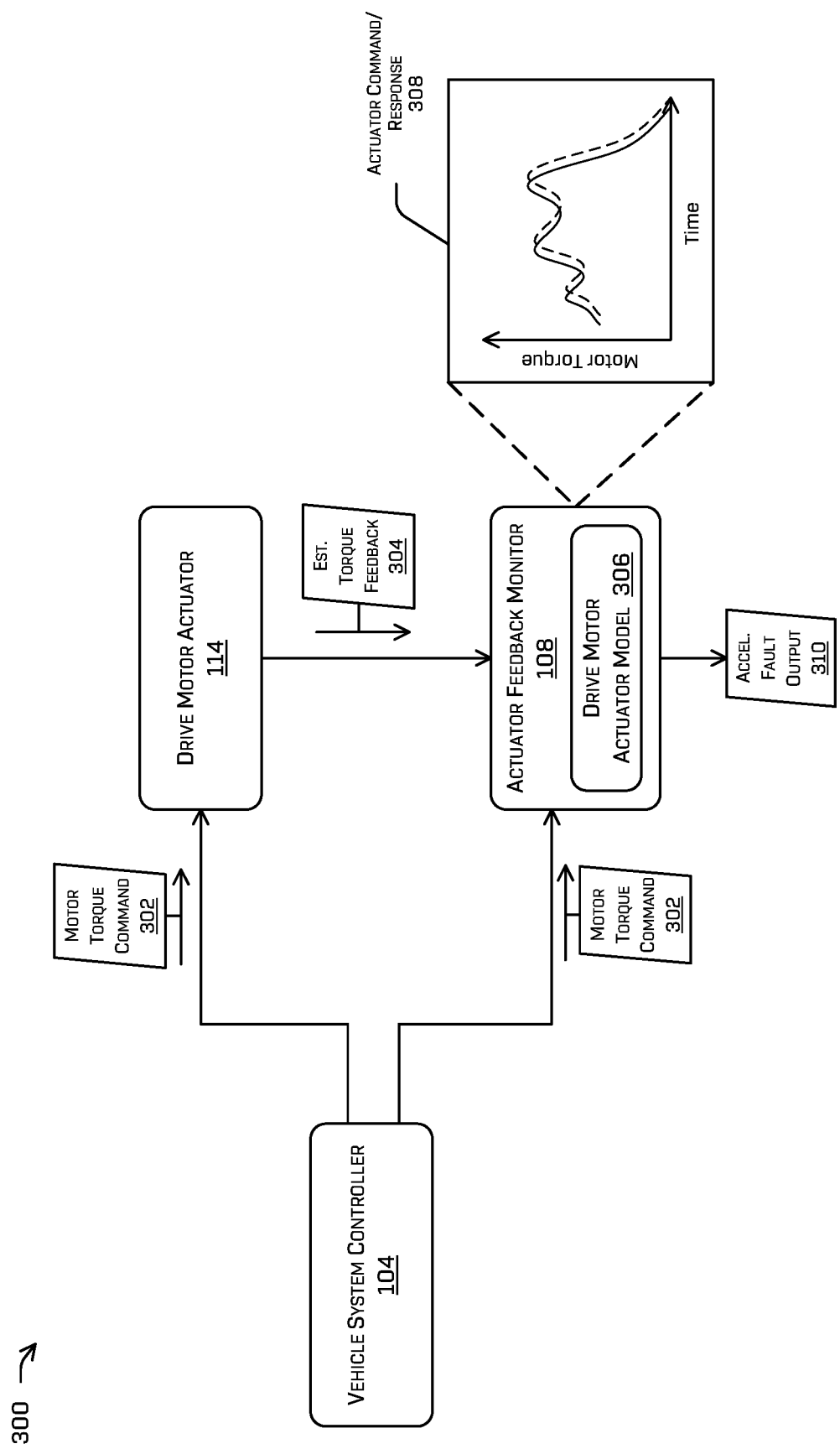
FIG. 3 illustrates components of an example system including an actuator feedback monitor configured to detect acceleration faults in a vehicle drive system, in accordance with one or more implementations of the disclosure.
Figure 4:
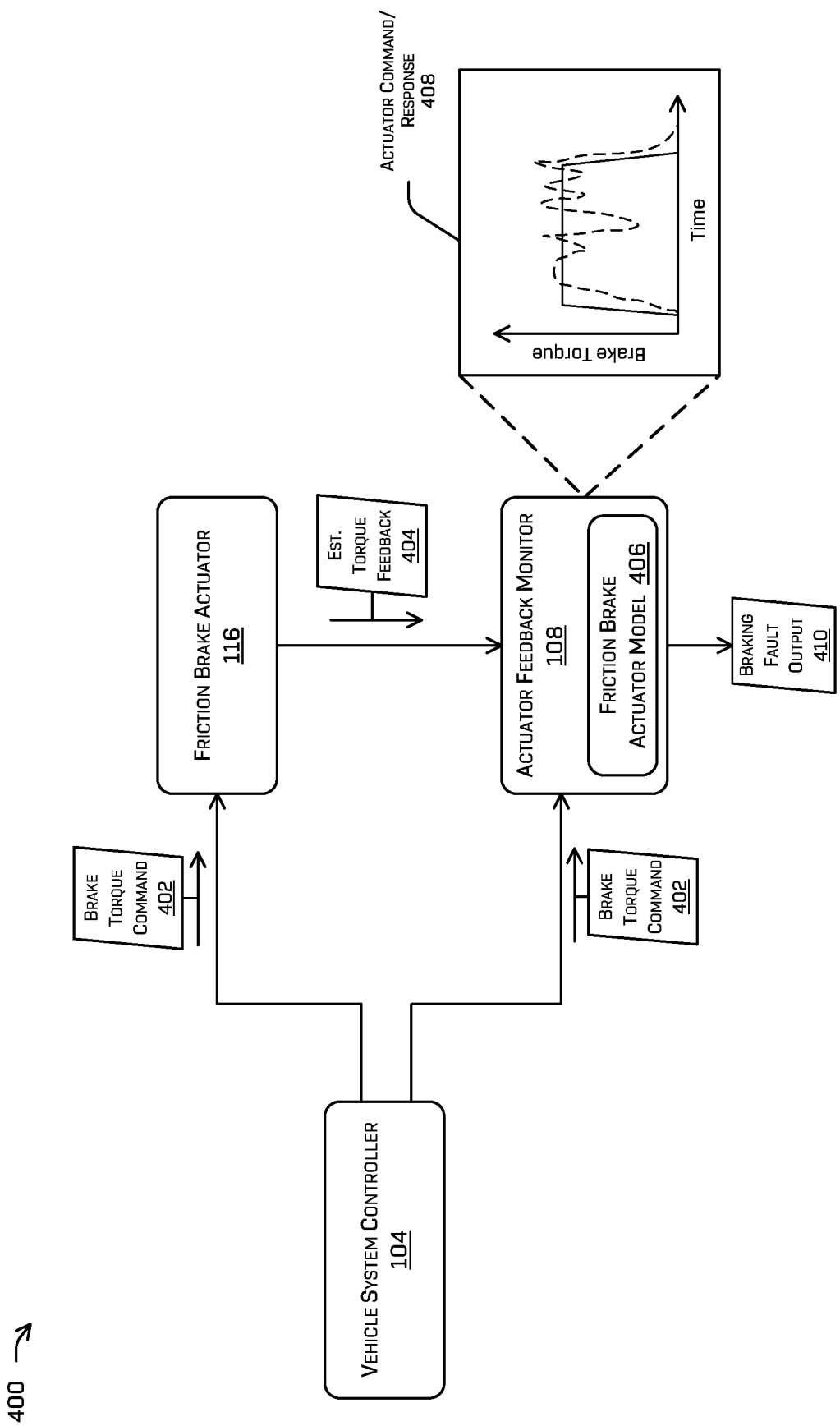
FIG. 4 illustrates components of an example system including an actuator feedback monitor configured to detect braking faults in a vehicle drive system, in accordance with one or more implementations of the disclosure.
Figure 5:
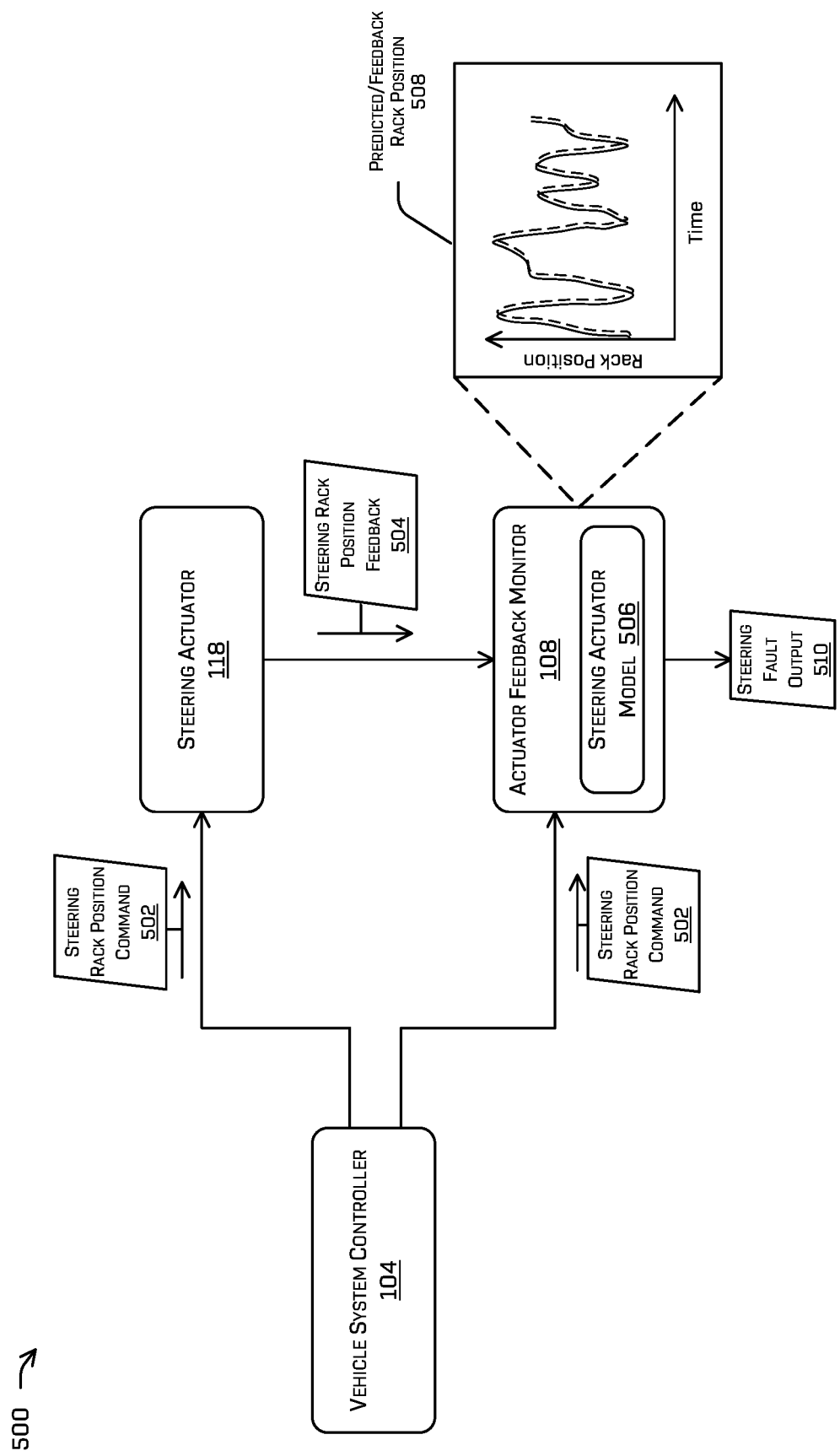
FIG. 5 illustrates components of an example system including an actuator feedback monitor configured to detect steering faults in a vehicle drive system, in accordance with one or more implementations of the disclosure.

FIGS. 3-5 depict example systems including actuator feedback monitors. FIG. 3 shows an example of an actuator feedback monitor associated with a drive motor actuator 114, FIG. 4 shows an example of an actuator feedback monitor associated with a friction brake actuator 116, and FIG. 5 shows an example of an actuator feedback monitor associated with a steering actuator 118. The example systems depicted in FIGS. 3-5 may be implemented within a vehicle drive monitoring system 102, and the various monitors described in these examples may be implemented individually or in combination with any other vehicle drive system monitors described herein.

FIG. 3 is an example system 300 in which an actuator feedback monitor 108 is configured to receive feedback from a drive motor actuator 114, and evaluate the feedback based on acceleration commands provided to the drive system by a vehicle system controller 104. In this example, the vehicle system controller 104 transmits a motor torque command 302 to the vehicle drive system(s) 106, which is received by the drive motor actuator 114. The motor torque command 302 also may be routed to the actuator feedback monitor 108. In this example, the motor torque command 302 may be a single discrete command or may be a continuous signal from the vehicle system controller 104 that specifies the requested level of torque to be provided by the drive motor actuator 114.

As noted above, the drive motor actuator 114 may be implemented using an electronic drive unit (EDU) that is configured to control (e.g., regulate or actuate) various components of the vehicle drive system(s) 106 in response to the motor torque command 302. The drive motor actuator 114 also may be configured to provide an estimated torque feedback 304 to the actuator feedback monitor 108 (and/or to the vehicle system controller 104) indicating an estimation of the actual amount of torque provided by the drive motor actuator 114 to its downstream components within the vehicle drive system(s) 106.

The actuator feedback monitor 108 in this example may include a drive motor actuator model 306 to determine a predicted torque output based on the motor torque command 302. In some examples, the drive motor actuator model 306 may include a transfer function to calculate a predicted torque output based on the motor torque command 302, and then compare the predicted torque output to the estimated torque feedback 304 received from the drive motor actuator 114. The drive motor actuator model 306 also may include a discrete low-pass filter with a predetermined coefficient configured to approximate the delay in the torque application by the drive motor actuator 114, and/or may include a pure delay value (e.g., 10 ms, 20 ms, 30 ms, etc.) to account for data transmission time. In various examples, the pure delay value may be based on a frequency response for system identification or other command provided by the drive motor actuator 114 to the vehicle drive system(s) 106. Chart 308 depicts an example chart representing a command signal (e.g., motor torque command 302) as an unbroken line, and a corresponding feedback signal (e.g., estimated torque feedback 304) as a dotted line. As shown in this example, the feedback signal approximately corresponds to but also may lag behind the command signal, and thus a drive motor actuator model 306 using a transfer function with a low-pass filter and time delay may be used to reduce or minimize the time lag and/or other discrepancies between the two signals. In other examples, the drive motor actuator model 306 need not use pure delay and first order delay, but may include more complex models based on any combination of additional inputs received from the drive motor actuator 114.

The actuator feedback monitor 108 may provide an acceleration fault output 310 based on the comparison of the predicted torque output to the estimated torque feedback 304 from the drive motor actuator 114. In some cases, the actuator feedback monitor 108 may provide an output when the difference (e.g., magnitude and/or time duration) meets or exceeds a threshold. In other cases, the actuator feedback monitor 108 may provide a continuous output representing a current difference between the predicted torque output and estimated torque feedback 304. As noted above, when the acceleration fault output 310 exceeds one or more threshold values, the actuator feedback monitor 108 may initiate one or more vehicle control actions. For instance, the vehicle drive monitoring system 102 may instruct the vehicle drive system(s) 106 to initiate an emergency safe stop of the vehicle, based on determining that the acceleration fault output 310 is greater than a threshold magnitude, and/or that the acceleration fault output 310 persists for longer than a threshold time duration.

As noted above, the actuator feedback monitor 108 may implement disable conditions during which acceleration fault output 310 is not calculated and/or output by the actuator feedback monitor 108. In the case of feedback monitoring for a drive motor actuator 114, the disable conditions may include disabling the monitor 108 for the duration of a clutch engagement by the vehicle. In other examples any combination of the above disable conditions associated with the drive motor actuator 114 may be used as input to the drive motor actuator model 306, instead of as disabling conditions. In such cases, the drive motor actuator model 306 may dynamically adjust the predicted drive motor torque feedback to take into account the various vehicle states (e.g., clutch engagement), and may output a predicted actuator feedback based on the control command and the current vehicle states (e.g., clutch engagement).

In some examples, the actuator feedback monitor 108 also may be configured to revise the monitoring parameters, such as the predetermined time delay, the low-pass filter coefficient(s), the disable conditions, and/or the difference thresholds for initiating vehicle control actions. For example, the actuator feedback monitor 108 may track and analyze the difference over time between the predicted torque output to the estimated torque feedback 304, determine trends and identify false positive and/or false negative fault determinations, and use the analysis to update the monitoring parameters so that the predicted torque output more accurately matches the estimated torque feedback 304.

FIG. 4 is an example system 400 in which the actuator feedback monitor 108 is configured to receive feedback from a friction brake actuator 116, and evaluate the feedback based on braking commands provided to the drive system by a vehicle system controller 104. In this example, the vehicle system controller 104 transmits a brake torque command 402 to the vehicle drive system(s) 106, which is received by the friction brake actuator 116. The brake torque command 402 also may be routed to the actuator feedback monitor 108. As in the above example, the brake torque command 402 may be a single discrete command or may be a continuous signal from the vehicle system controller 104 that specifies the requested level of torque to be provided by the friction brake actuator 116 to the friction braking system.

The friction brake actuator 116 may be implemented using an EDU configured to control (e.g., regulate or actuate) various components of the vehicle drive system(s) 106 in response to the brake torque command 402. The friction brake actuator 116 also may be configured to provide an estimated torque feedback 404 to the actuator feedback monitor 108 (and/or to the vehicle system controller 104) indicating an estimation of the actual amount of torque provided by the friction brake actuator 116 to the friction braking system within the vehicle drive system(s) 106.

The actuator feedback monitor 108 in this example may include a friction brake actuator model 406 to determine a predicted friction brake torque output based on the brake torque command 402. In some examples, the friction brake actuator model 406 may include the same or a transfer function as the drive motor actuator model 306, to calculate the predicted friction brake torque output based on the brake torque command 402, and then compare the predicted friction brake torque output to the estimated torque feedback 404 received from the friction brake actuator 116. The friction brake actuator model 406 also may include a rate limiter with predetermined positive and/or negative rate limits configured to approximate the deviation in the torque provided by the friction brake actuator 116, and/or may include a pure delay value (e.g., 50 ms, 80 ms, 100 ms, etc.) to account for data transmission time. discrete low-pass filter with a predetermined coefficient configured to approximate the delay in the torque application by the drive motor actuator 114, and/or may include a pure delay value (e.g., 10 ms, 20 ms, 30 ms, etc.) to account for data transmission time. In various examples, the pure delay value may be based on a frequency response for system identification or other command provided by the friction brake actuator 116 to the vehicle drive system(s) 106. Chart 408 depicts an example chart representing a command signal (e.g., brake torque command 402) as an unbroken line, and a corresponding feedback signal (e.g., estimated torque feedback 404) as a dotted line. As shown in this example, the feedback signal may vary from and/or lag behind the command signal, and thus the transfer function, rate limiter, and/or pure time delay used by the friction brake actuator model 406 may be used to reduce or minimize the time lag and/or other discrepancies between the two signals.

The actuator feedback monitor 108 may provide a braking fault output 410 based on the comparison of the predicted friction brake torque to the estimated torque feedback 404 from the friction brake actuator 116. In some cases, the actuator feedback monitor 108 may provide an output when the difference meets or exceeds a threshold. In other cases, the actuator feedback monitor 108 may provide a continuous output representing a current difference between the predicted friction brake torque and estimated torque feedback 404. As noted above, when the braking fault output 410 exceeds one or more threshold values, the actuator feedback monitor 108 may initiate one or more vehicle control actions. For instance, the vehicle drive monitoring system 102 may instruct the vehicle drive system(s) 106 to initiate an emergency safe stop of the vehicle, based on determining that the braking fault output 410 is greater than a threshold magnitude, and/or that the braking fault output 410 persists for longer than a threshold time duration.

As noted above, the actuator feedback monitor 108 may implement disable conditions during which braking fault output 410 is not calculated and/or output by the actuator feedback monitor 108. In the case of feedback monitoring for a friction brake actuator 116, the disable conditions may include disabling the monitor when any one or more of the following vehicle systems are engaged: an anti-lock braking system (ABS), a smart brake support (SBS) system, an electronic stability control (ESC) system, a traction control system (TCS), an active diagnostic trouble code (DTC), and/or an electronic brake force distribution (EBD) system. In other examples, any combination of the above disable conditions associated with the friction brake actuator 116 may be used as input to the friction brake actuator model 406, instead of as disabling conditions. In such cases, the friction brake actuator model 406 may dynamically adjust the predicted friction brake torque feedback to take into account the various vehicle states (e.g., ABS activation), and may output a predicted actuator feedback based on the control command and the current vehicle states (e.g., ABS activation).

As in the above example, the actuator feedback monitor 108 may be configured to revise the monitoring parameters, such as the predetermined time delay, the rate limiter limits, the disable conditions, and/or the difference thresholds for initiating vehicle control actions based on the detection of friction brake actuator and/or braking system faults.

FIG. 5 is an example system 500 in which the actuator feedback monitor 108 is configured to receive feedback from a steering actuator 118, and evaluate the feedback based on steering rack position commands provided to the drive system by a vehicle system controller 104. In this example, the vehicle system controller 104 transmits a steering rack position command 502 to the vehicle drive system(s) 106, which is received by the steering actuator 118 (e.g., an electric power assisted steering (EPAS) system). The steering rack position command 502 also may be routed to the actuator feedback monitor 108. As in the above example, the steering rack position command 502 may be a single discrete command or may be a continuous signal from the vehicle system controller 104 that specifies the requested steering rack position to be applied by the EPAS system.

The steering actuator 118 may be configured to control (e.g., regulate or actuate) various components of EPAS to control the position and/or angle of the steering rack in response to the steering rack position command 502. The steering actuator 118 also may be configured to provide steering rack position feedback 504 to the actuator feedback monitor 108 (and/or to the vehicle system controller 104) indicating a current steering rack position within vehicle drive system(s) 106.

The actuator feedback monitor 108 in this example includes a steering actuator model 506 used to determine a predicted steering rack position based on the steering rack position command 502. In various examples, the steering actuator model 506 may use the same or different transfer function(s) discussed above to calculate a predicted steering rack position based on the steering rack position command 502, and then compare the predicted steering rack position to the steering rack position feedback 504 received from the steering actuator 118. For instance, the steering actuator model 506 used in this example may include a time delay (e.g., 20 ms, 30 ms, etc.) coupled with a discrete low-pass filter with a filter coefficient configured to approximate the discrepancies between the command signal (e.g., the steering rack position command 502) and feedback signal (e.g., steering rack position feedback 504) and/or data transmission and processing time. Chart 508 depicts an example chart representing a command signal (e.g., steering rack position command 502) as an unbroken line, and a corresponding feedback signal (e.g., steering rack position feedback 504) as a dotted line. As shown in this example, the feedback signal approximately corresponds to but also may lag behind the command signal, and thus the steering actuator model 506 with the low-pass filter and/or time delay may be used to reduce or minimize the time lag and/or other discrepancies between the two signals.

The actuator feedback monitor 108 may provide a steering fault output 510 based on the comparison of the predicted steering rack position to the steering rack position feedback 504 from the steering actuator 118. In some cases, the actuator feedback monitor 108 may provide an output when the difference meets or exceeds a threshold. In other cases, the actuator feedback monitor 108 may provide a continuous output representing a current difference between the predicted steering rack position and steering rack position feedback 504. As noted above, when the steering fault output 510 exceeds one or more threshold values, the actuator feedback monitor 108 may initiate one or more vehicle control actions. For instance, the vehicle drive monitoring system 102 may instruct the vehicle drive system(s) 106 to initiate an emergency safe stop of the vehicle, based on determining that the steering fault output 510 is greater than a threshold magnitude, and/or that the steering fault output 510 persists for longer than a threshold time duration.

As noted above, the actuator feedback monitor 108 may implement disable conditions during which steering fault output 510 is not calculated and/or output by the actuator feedback monitor 108. In the case of feedback monitoring for a steering actuator 118, the disable conditions may include disabling the monitor when any one or more of the following vehicle systems are engaged: an electronic stability control (ESC) system, a loss of tire pressure, and/or an active diagnostic trouble code (DTC). In other examples, any combination of the above disable conditions associated with the steering actuator 118 may be used as input to the steering actuator model 506, instead of as disabling conditions. In such cases, the steering actuator model 506 may dynamically adjust the predicted steering rack position feedback to take into account the various vehicle states (e.g., ESC activation), and may output a predicted steering actuator feedback based on the control command and the current vehicle states (e.g., ESC activation).

As in the above example, the actuator feedback monitor 108 may be configured to revise the monitoring parameters, such as the predetermined time delay, the low-pass filter coefficient, the disable conditions, and/or the difference thresholds for initiating vehicle control actions based on the detection of steering actuator and/or steering system faults.

Figure 6:
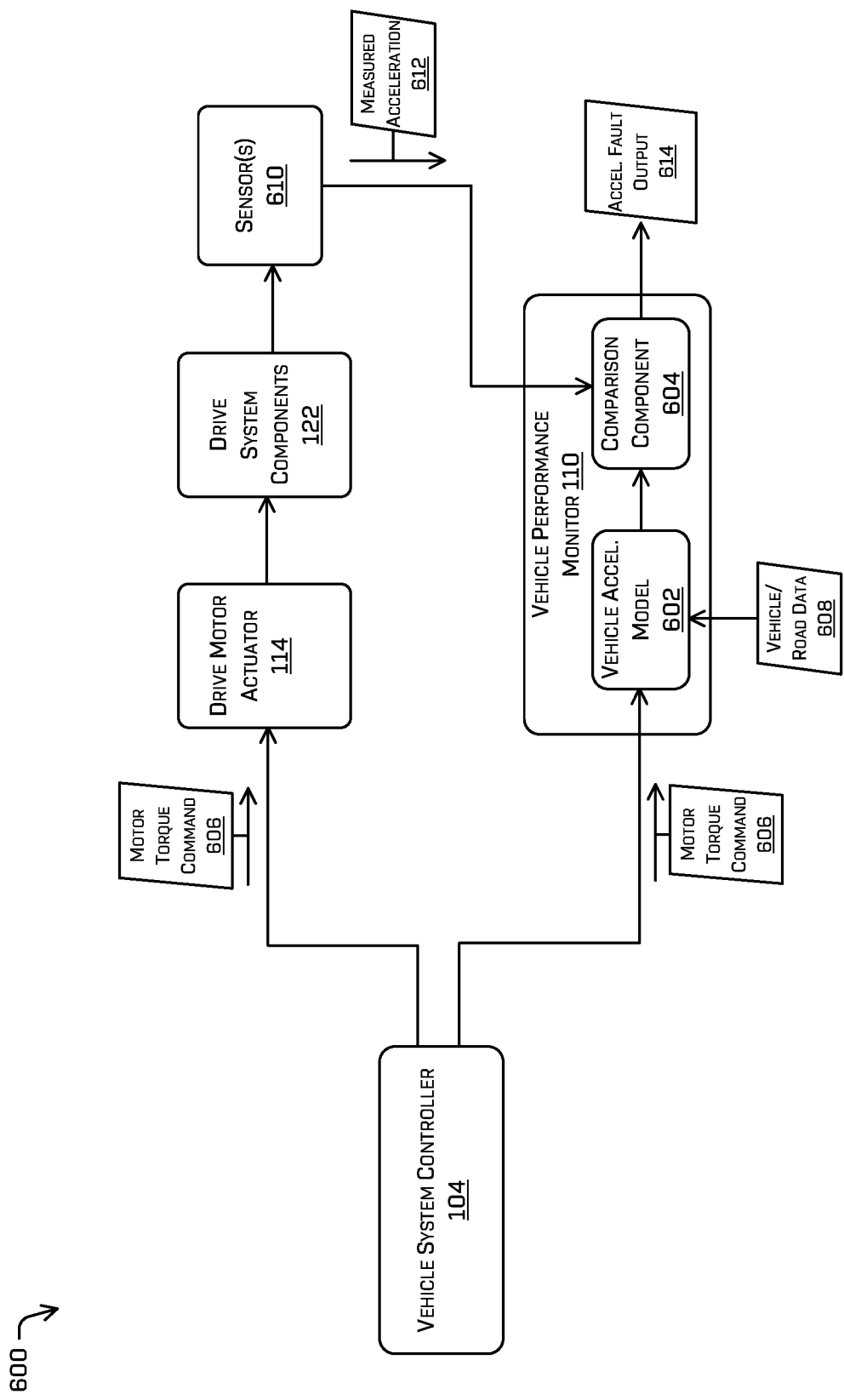
FIG. 6 illustrates components of an example system including a vehicle performance monitor configured to detect acceleration faults in a vehicle drive system, in accordance with one or more implementations of the disclosure.
Figure 7:
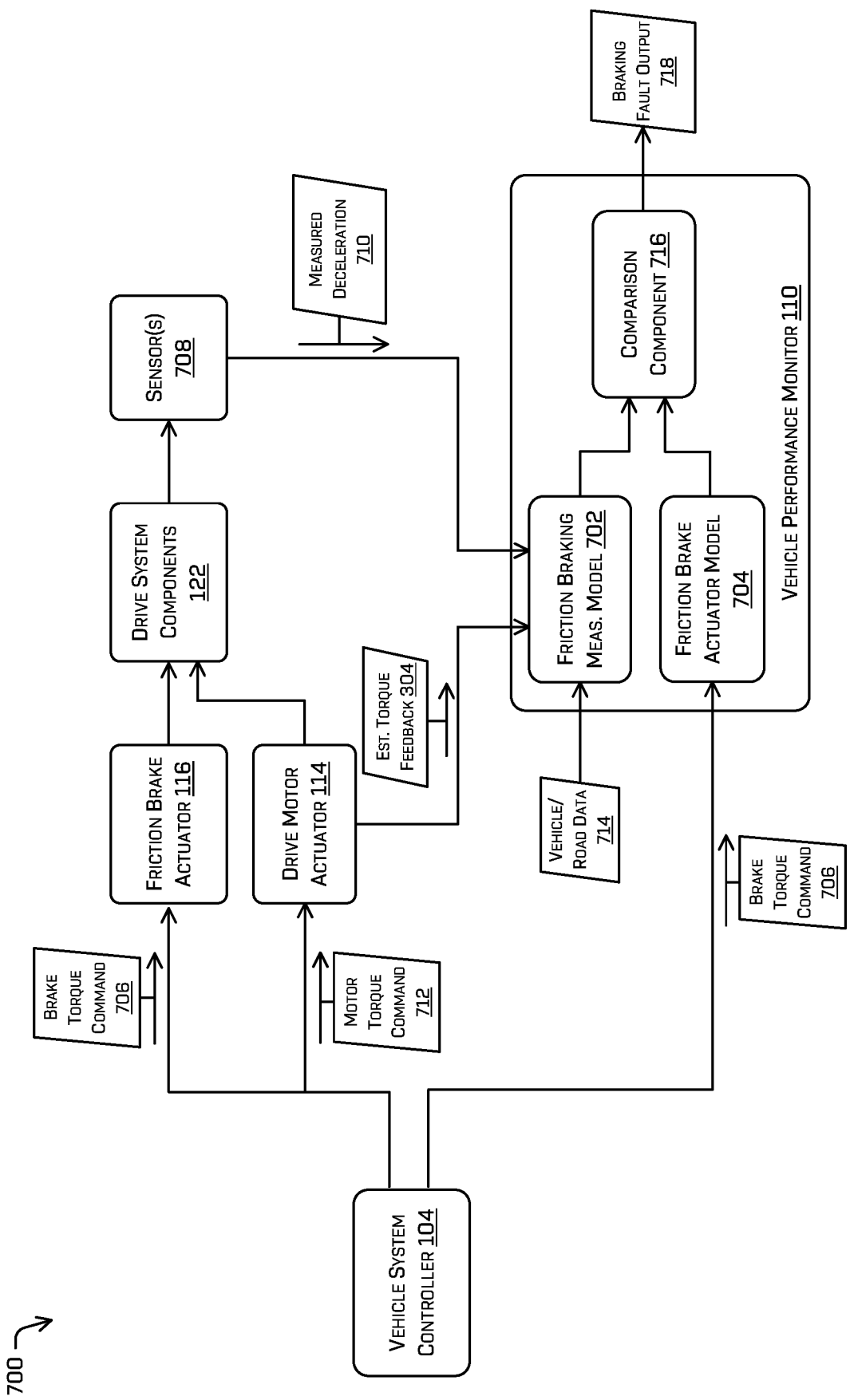
FIG. 7 illustrates components of an example system including a vehicle performance monitor configured to detect braking faults in a vehicle drive system, in accordance with one or more implementations of the disclosure.
Figure 8:
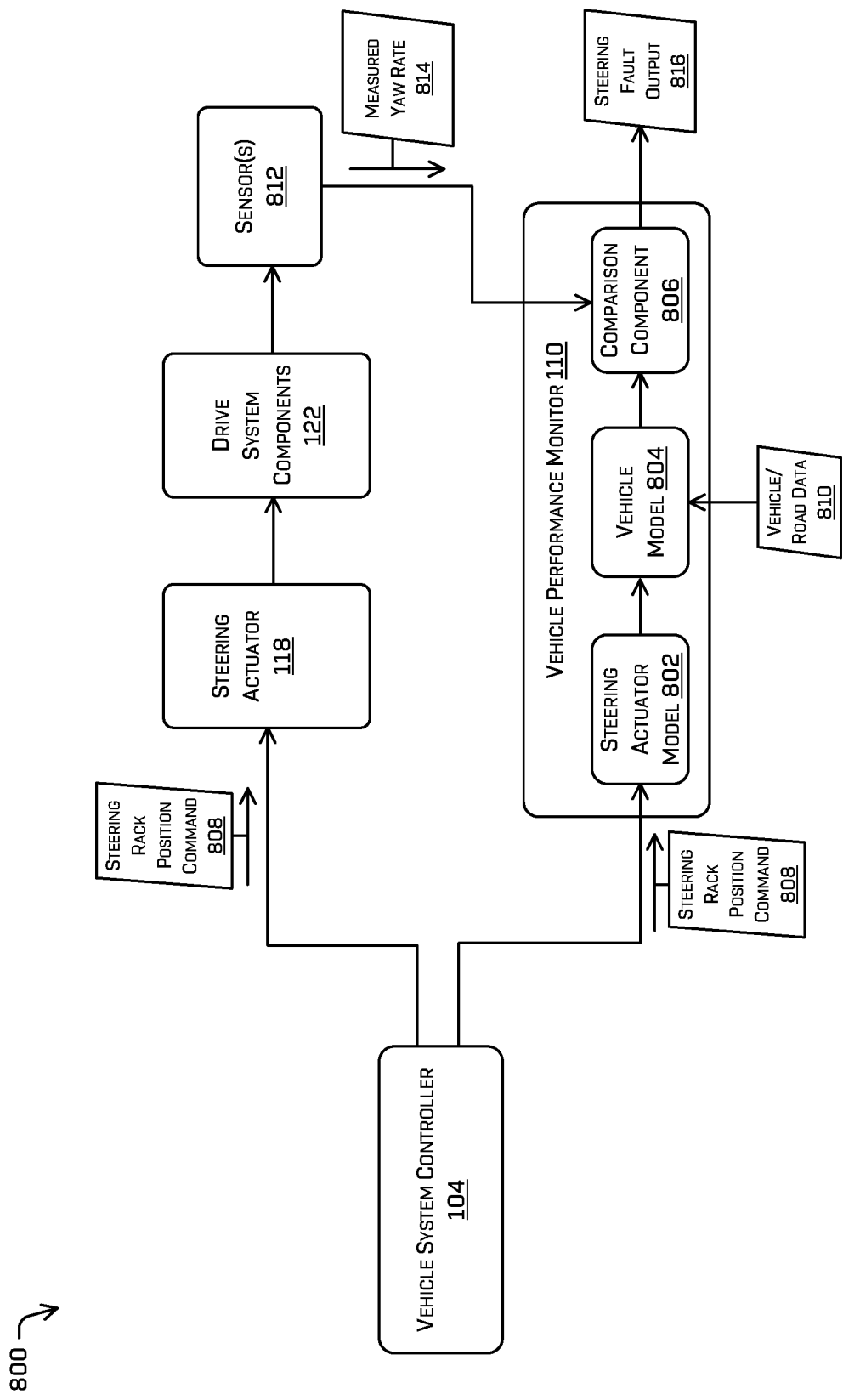
FIG. 8 illustrates components of an example system including a vehicle performance monitor configured to detect steering faults in a vehicle drive system, in accordance with one or more implementations of the disclosure.

FIGS. 6-8 depict example systems including vehicle performance monitors configured to execute vehicle state models. FIG. 6 shows an example of a vehicle performance monitor 110 including a vehicle acceleration model 602 based on an acceleration command, FIG. 7 shows an example of a vehicle performance monitor 110 including a friction brake actuator model 704 and a friction braking measurement model 702 based on a braking command, and FIG. 8 shows an example of a vehicle performance monitor 110 including a steering actuator model 802 and vehicle model 804 associated with a steering command. The example systems depicted in FIGS. 6-8 may be implemented within a vehicle drive monitoring system 102, and the various monitors described in these examples may be implemented individually or in combination with any other vehicle drive system monitors described herein.

FIG. 6 is an example system 600 in which a vehicle performance monitor 110 is configured to receive measured acceleration data for the vehicle, and evaluate the acceleration capabilities and/or components of the vehicle drive system(s) 106 based on the acceleration commands provided to the drive systems by a vehicle system controller 104. In this example, the vehicle performance monitor 110 includes a vehicle acceleration model 602 configured to execute an algorithm to predict the acceleration of the vehicle based on acceleration commands received from vehicle system controller 104 and/or other input data. The vehicle performance monitor 110 also includes a comparison component 604 configured to compare the predicted vehicle acceleration determined by the vehicle acceleration model 602 with the measured vehicle acceleration, to thereby determine one or more potential faults within the drive motor actuator 114 and/or the drive system components 122 within the propulsion system of the vehicle.

In this example, the vehicle system controller 104 transmits a motor torque command 606 to the drive motor actuator 114 of the vehicle drive system(s) 106. A motor torque command 606 may be transmitted to a single actuator (e.g., drive motor actuator 114) to multiple EDUs and/or other actuators within the vehicle drive system(s) 106. For instance, the motor torque commands 606 may include a first motor torque command provided to a first (e.g., front) motor of the vehicle, and a second motor torque command provided to a second (e.g., rear) motor of the vehicle. The motor torque command(s) 606 may be a single discrete command or may be a continuous signal from the vehicle system controller 104 that specifies the requested level of torque to be provided to the electric motor and/or other components in the propulsion system of the vehicle. As described above, the drive motor actuator 114 and/or other actuators and EDUs may control the various drive system components 122 within the vehicle drive system(s) 106 to cause the vehicle to accelerate based on the motor torque command(s) 606 received from the vehicle system controller 104.

The motor torque command 606 also may be routed to the vehicle performance monitor 110, either directly or indirectly via the drive motor actuator 114. The vehicle acceleration model 602 may use the motor torque command 606 and/or other vehicle/road data 608 to calculate a predicted vehicle acceleration. In some examples, vehicle/road data 608 may include real-time estimates of the vehicle mass, the rolling radius, and the current road grade, and these real-time estimates may be used by the prediction algorithm(s) of the vehicle acceleration model 602. Additionally or alternatively, the vehicle/road data 608 may include data such as the current speed of the vehicle, the current tire pressure of the vehicle, the temperature(s) of various drive system components, the ambient temperature in the environment, the current driving road surface and road conditions, the current weather and/or wind, and the general vehicle conditions including the age and wear and tear of the drive system components.

The vehicle acceleration model 602 may be configured with one or more algorithm(s) to predict the acceleration of the vehicle based on the motor torque command(s) 606 (e.g., command signals) and the additional vehicle/road data 608. In some examples, the vehicle acceleration model 602 may execute different algorithms to predict acceleration depending on whether the vehicle is moving straight or turning/cornering. For a straight-line vehicle acceleration prediction, the vehicle acceleration model 602 may use an algorithm based on input data including the motor torque command(s) 606, vehicle mass, the rolling radius, and/or the current road grade. For a cornering vehicle acceleration prediction, the vehicle acceleration model 602 may use a different algorithm (e.g., a two-wheel bicycle model) based on the same input data, as well as the additional inputs of steering rack position and lateral acceleration. For instance, when the vehicle is turning, the vehicle acceleration model 602 may determine the amount of turning based on a steering rack position, and may account for local wheel frame forces to derive acceleration along the x-axis of the body. To calculate the acceleration torque, the vehicle acceleration model 602 may combine a vehicle dynamics model for lateral and/or longitudinal movement (e.g., a two-wheel bicycle model) with inputs including the steering rack position and the lateral acceleration of the vehicle.

The comparison component 604 may compare the predicted vehicle acceleration determined by the vehicle acceleration model 602 with the actual measured vehicle acceleration captured by vehicle sensors. As shown in this example, one or more sensors 610 (e.g., an inertial measurement unit (IMU)), within or external to the vehicle drive system(s) 106 may determine and transmit measured acceleration data 612 to the comparison component 604. In other examples, the measured acceleration data 612 may be provided by IMUs and/or based on other sensor data within a pose system or other vehicle components.

The vehicle performance monitor 110 may provide an acceleration fault output 614 based on the comparison of the predicted vehicle acceleration and the measured acceleration data 612. In some cases, the vehicle performance monitor 110 may provide an output when the difference meets or exceeds a threshold. In other cases, the vehicle performance monitor 110 may provide a continuous output representing a current difference between the predicted and measured accelerations. As noted above, when the acceleration fault output 614 exceeds one or more threshold values, the vehicle performance monitor 110 may initiate one or more vehicle control actions. For instance, the vehicle drive monitoring system 102 may instruct the vehicle drive system(s) 106 to initiate an emergency safe stop of the vehicle, based on determining that the acceleration fault output 614 is greater than a threshold magnitude, and/or that the acceleration fault output 614 persists for longer than a threshold time duration.

As noted above, in some cases a vehicle drive monitoring system 102 may use the combination of actuator feedback monitor(s) 108 and vehicle performance monitor(s) 110 to evaluate the performance of a particular drive system and/or functionality (e.g., acceleration, braking, or steering). For instance, the vehicle drive monitoring system 102 may initiate an emergency stop and/or any of the other vehicle control actions described herein, based on a combination of the acceleration fault output 310 from the actuator feedback monitor 108 and the acceleration fault output 614 from the vehicle performance monitor 110. As an example, when both of the acceleration fault output 310 and acceleration fault output 614 are greater than their respective thresholds for a predetermined duration of time, or when the sum of the acceleration fault output 310 and acceleration fault output 614 are greater than a combined thresholds for a predetermined duration of time, etc., then the vehicle drive monitoring system 102 may initiate the vehicle control action.

As noted above, the vehicle performance monitor 110 also may implement disable conditions during which acceleration fault output 614 is not calculated and/or output by the vehicle performance monitor 110. For a vehicle performance monitor 110 configured to monitor vehicle acceleration, the disable conditions may include one or more of clutch engagement, ABS engagement, ESC engagement, runout condition active, loss of tire pressure, invalid input signals, and/or loss of communications. The vehicle performance monitor 110 also may be configured to dynamically revise the algorithms used by the vehicle acceleration model 602 and/or thresholds used by the comparison component 604, based on tracking and analyzing the differences over time between the predicted and measured accelerations, trends, false positive and/or false negative fault determinations, and/or changes within the vehicle systems. In other examples, any combination of the above disable conditions associated with the motor torque commands 606 and the drive motor actuator 114 may be used as input to the vehicle acceleration model 602, instead of as disabling conditions. In such cases, the predicted vehicle state (e.g., change in acceleration) output by the vehicle acceleration model 602 may be further based on various vehicle states such as clutch engagement, ABS engagement, ESC engagement, runout condition active, loss of tire pressure, etc.

FIG. 7 is an example system 700 in which a vehicle performance monitor 110 is configured to receive measured deceleration data for the vehicle, and to evaluate the friction braking capabilities (and/or components) of the vehicle drive system(s) 106 in response to the control commands provided to the drive systems by a vehicle system controller 104. In this example, the vehicle performance monitor 110 includes a friction braking measurement model 702 configured to calculate a measurement of friction braking based on the estimated torque feedback received from the drive motor actuator, the actual measured deceleration of the vehicle, and/or other input data (e.g., vehicle driving data, road condition data, etc.). The vehicle performance monitor 110 in this example also includes a friction brake actuator model 704, which may be similar or identical to the friction brake actuator model 406 described above. The friction brake actuator model 704 may be configured to execute a transfer function and/or other algorithm to predict the actuator feedback from the friction brake actuator 116, based on brake torque commands received from the vehicle system controller 104.

In this example, the friction braking measurement model 702 may use the estimated torque feedback 304 from the drive motor actuator 114, the measured deceleration 710 of the vehicle, and/or other inputs (e.g., vehicle road data 714) to determine a predicted vehicle state change (e.g., the amount of vehicle deceleration) that is attributable to the brake torque command 706 provided to the friction brake actuator 116. The drive motor actuator 114 may provide the estimated torque feedback 304 to the friction braking measurement model 702, based on one or more motor torque commands 712 received from the vehicle system controller(s) 104. In some cases, a portion of the measured deceleration 710 of the vehicle is attributable to the drive motor. Accordingly, the friction braking measurement model 702 may use the estimated torque feedback 304 from the drive motor actuator 114 to determine the portion of the vehicle deceleration attributable to the drive motor, in order to determine the additional portion of the vehicle deceleration attributable to the friction braking system.

The friction brake actuator model 704 in this example may be configured to determine and output a predicted feedback of the friction brake actuator 116, based on the brake torque command 706. In some cases, the output of the friction brake actuator model 704 may correspond to, or may be converted into, a predicted measurement of vehicle deceleration that is attributable to the friction braking system, based on the predicted feedback of the friction brake actuator 116. The comparison component 716 may compare the output of the friction braking measurement model 702 to the output of the friction brake actuator model 704, to determine the braking fault output 718.

In various examples, the friction braking measurement model 702, friction brake actuator model 704, and/or the comparison component 716 may be combined into a single model within the vehicle performance monitor 110. The vehicle performance monitor 110 thus may determine the braking fault output 718 based on the various inputs including actuator feedback from the drive motor actuator 114, and predicted actuator feedback via the friction brake actuator model 704, as both actuator feedbacks may be associated with the dynamic longitudinal forces applied to the vehicle. Because both the drive motor and the friction braking system may contribute to the deceleration of the vehicle, the friction brake actuator model 704 may predict actuator feedback for the friction braking actuator 116, and the determination of the friction braking measurement model 702 may be based on the estimated torque feedback 304 from the drive motor actuator 114. By determining, using the estimated torque feedback 304 from the drive motor actuator 114, that a portion of the measured deceleration 710 of the vehicle is attributable to the drive motor, the friction braking measurement model 702 may determine that an additional portion of the measured deceleration 710 is attributable to the friction braking system of the vehicle. After subtracting out the portion of the measured deceleration 710 attributable to the drive motor, the friction brake actuator model 704 may use the predicted feedback from the friction brake actuator model 704 and the vehicle/road data 714, to determine a predicted deceleration attributable to the friction braking system. The comparison component 716 then may compare the predicted deceleration attributable to the friction braking system determined by the friction braking measurement model 702, to the corresponding predicted deceleration determined by the friction brake actuator model 704, to thereby determine one or more potential faults within the friction brake actuator 116 and/or the drive system components 122 within the friction braking system(s) of the vehicle.

In this example, the vehicle system controller 104 transmits one or more brake torque commands 706 to friction brake actuator 116, and/or motor torque commands 712 to the drive motor actuator 114 (and/or other EDUs) of the vehicle drive system(s) 106. In some cases, the brake torque commands 706 may include a first brake torque command provided to a first (e.g., front) braking system of the vehicle, and a second brake torque command 706 provided to a second (e.g., rear) braking system of the vehicle. The brake torque command(s) 706 may be a single discrete command or may be a continuous signal from the vehicle system controller 104 that specifies the requested level of torque to be provided to the braking systems of the vehicle.

In various examples, the friction braking measurement model 702 may be configured with one or more algorithm(s) to predict the portion of the vehicle deceleration attributable to the brake torque command(s) 706 (e.g., friction braking deceleration) and/or the portion of the deceleration attributable to the motor torque command(s) 712. In some examples, the friction braking measurement model 702 may execute different algorithms to predict friction braking deceleration depending on whether the vehicle is moving straight or turning/cornering. For a straight-line vehicle braking, the friction braking measurement model 702 may use an algorithm based on input data including the brake torque command(s) 706, vehicle mass, the rolling radius, and/or the current road grade. For a cornering vehicle deceleration prediction, the friction braking measurement model 702 may use a different algorithm based on the same input data as well as the additional inputs of steering rack position and lateral acceleration.

The comparison component 716 may receive and compare the respective friction braking deceleration determinations performed by the friction braking measurement model 702 and the friction brake actuator model 704. As shown in this example, the friction braking measurement model 702 may receive measured deceleration data 710 from sensor(s) 708 (e.g., an IMU) within (or external to) the vehicle drive system(s) 106, and may determine the friction braking deceleration based on the measured deceleration data 710 (e.g., excluding the deceleration caused by the drive motor, the driving terrain, road grade and conditions, etc.). In other examples, the measured deceleration data 710 may be provided directly to the comparison component 716 and used in the comparison with the predicted friction braking deceleration(s).

The braking fault output 718 provided by the vehicle performance monitor 110 may be based on the comparison of the predicted and measured friction brake decelerations (e.g., the amount of vehicle deceleration attributable to the brake torque command 706 and/or friction braking system). In some cases, the vehicle performance monitor 110 may provide an output when the difference meets or exceeds a threshold. In other cases, the vehicle performance monitor 110 may provide a continuous output representing a current difference between the predicted and measured friction brake decelerations. As noted above, when the braking fault output 718 exceeds one or more threshold values, the vehicle performance monitor 110 may initiate an emergency safe stop and/or various other vehicle control actions. The vehicle drive monitoring system 102 may instruct the vehicle drive system(s) 106 to initiate a vehicle control action based on determining that the braking fault output 718 is greater than a threshold magnitude, and/or that the braking fault output 718 persists for longer than a threshold time duration. As noted above, the vehicle drive monitoring system 102 also may initiate an emergency stop and/or any of the other vehicle control actions described herein, based on a combination of the braking fault output 410 from the actuator feedback monitor 108 and the braking fault output 718 from the vehicle performance monitor 110.

As noted above, the vehicle performance monitor 110 also may implement disable conditions during which braking fault output 718 is not calculated and/or output by the vehicle performance monitor 110. For a vehicle performance monitor 110 configured to monitor friction brake deceleration, the disable conditions may include one or more of ABS engagement, ESC engagement, runout condition active, loss of tire pressure, invalid input signals, loss of communications, torque estimates from the EDUs (e.g., actuators 114-118) are significantly different than model estimates (e.g., indicating a possible EDU failure), and/or the total torque request is greater than a threshold (e.g., indicating a non-braking condition). The vehicle performance monitor 110 also may be configured to dynamically revise the algorithms and parameters used by the friction braking measurement model 702, the friction brake actuator model 704, and/or thresholds used by the friction brake actuator model 704, based on tracking and analyzing the differences over time between the predicted and measured friction braking decelerations, trends, false positive and/or false negative fault determinations, and/or changes within the vehicle systems. In other examples, any combination of the above disable conditions associated with the brake torque commands 706 and the friction braking actuator 116 may be used as input to the friction braking measurement model 702 and/or the friction brake actuator model 704, instead of as disabling conditions. In such cases, the predicted vehicle state (e.g., change in deceleration) output by the friction braking measurement model 702 may be further based on various vehicle states such as clutch engagement, ABS engagement, ESC engagement, runout condition active, loss of tire pressure, etc.

FIG. 8 is an example system 800 in which a vehicle performance monitor 110 is configured to receive steering rack position data for the vehicle, and evaluate the steering capabilities and/or components of the vehicle drive system(s) 106 based on the steering commands provided to the drive systems by a vehicle system controller 104. In this example, the vehicle performance monitor 110 includes a steering actuator model 802, a vehicle model 804, and a comparison component 806. The steering actuator model 802 may be similar or identical to the steering actuator model 506 described above. The vehicle model 804 may be configured to execute an algorithm to predict the steering rack position of the vehicle based on steering commands received from the vehicle system controller 104 and/or other input data. The vehicle performance monitor 110 also includes a comparison component 806 configured to compare the predicted steering rack position determined by the steering actuator model 802 with the actual measured steering rack position of the vehicle, to thereby determine one or more potential faults within the steering actuator 118 and/or the drive system components 122 within the steering system of the vehicle.

In this example, the vehicle system controller 104 transmits one or more steering rack position commands 808 to the steering actuator 118 (and/or other actuators or EDUs) of the vehicle drive system(s) 106. The steering rack position commands 808 may be a single discrete command or may be a continuous signal from the vehicle system controller 104 that specifies the requested steering rack position of the rack. The steering rack position commands 808 also may be routed to the vehicle performance monitor 110, either directly or indirectly via the steering actuator 118. The steering actuator model 802 may use the steering rack position commands 808 to determine predicted actuator feedback from the steering actuator 118, which may be provided as input to the vehicle model 804. The vehicle model 804 may use the predicted actuator feedback received from the steering actuator model 802, and/or vehicle/road data 810, to calculate a predicted steering rack position for the vehicle. In some examples, the vehicle/road data 810 may include any combination of the vehicle/road data 608 discussed above.

The vehicle model 804 may be configured with one or more algorithm(s) to predict the steering rack position of the vehicle based on the steering rack position commands 808, an estimated vehicle mass, a real-time determination of the moment of inertia, and an estimate of the current road bank. In other examples, the vehicle model 804 may use various additional input data such as the current speed of the vehicle, the current tire pressure of the vehicle, the temperature(s) of various drive system components, the ambient temperature in the environment, the current driving road surface and road conditions, the current weather and/or wind, and the general vehicle conditions including the age and wear and tear of the drive system components.

The comparison component 806 may compare the predicted steering rack position determined by the vehicle model 804 the actual measured steering rack position of the vehicle. As shown in this example, the comparison component 806 may receive measured yaw rate 814 from sensor(s) 812 (e.g., an IMU) within the vehicle drive system(s) 106 (or elsewhere within the vehicle). The vehicle performance monitor 110 may provide a steering fault output 816 based on the comparison of the steering rack position predicted by the vehicle model 804 and the measured yaw rate 814. In some cases, the vehicle performance monitor 110 may provide an output when the difference meets or exceeds a threshold. In other cases, the vehicle performance monitor 110 may provide a continuous output representing a current difference between the predicted and measured steering rack positions (e.g., or steering angles). As noted above, when the steering fault output 816 exceeds one or more threshold values, the vehicle performance monitor 110 may initiate an emergency safe stop and/or various other vehicle control actions. The vehicle drive monitoring system 102 may instruct the vehicle drive system(s) 106 to initiate a vehicle control action based on determining that the steering fault output 816 is greater than a threshold magnitude, and/or that the steering fault output 816 persists for longer than a threshold time duration. As noted above, the vehicle drive monitoring system 102 also may initiate an emergency stop and/or any of the other vehicle control actions described herein, based on a combination of the steering fault output 510 from the actuator feedback monitor 108 and the steering fault output 816 from the vehicle performance monitor 110. In some examples, in addition to or instead of controlling the vehicle with an emergency stop operation, the vehicle drive monitoring system 102 may control the vehicle to perform other operations limiting functionalities of the vehicle such as a steering rate or maximum steering angle, or may enforce a straight-line driving requirement with maneuvering performed via toe, caster, camber, etc.

As noted above, the vehicle performance monitor 110 also may implement disable conditions during which steering fault output 816 is not calculated and/or output by the vehicle performance monitor 110. For a vehicle performance monitor 110 configured to monitor steering command and resulting vehicle steering angles and/or steering rack positions, the disable conditions may include one or more of ESC engagement, loss of tire pressure, invalid input signals, and/or loss of communications. The vehicle performance monitor 110 also may be configured to dynamically revise the algorithms and parameters used by the vehicle model 804, and/or thresholds used by the comparison component 806, based on tracking and analyzing the differences over time between the predicted and measured steering rack positions/angles, trends, false positive and/or false negative fault determinations, and/or changes within the vehicle systems. In other examples, any combination of the above disable conditions associated with the steering rack position commands 808 and the steering actuator 118 may be used as input to the steering actuator model 802 and/or the vehicle model 804, instead of as disabling conditions. In such cases, the predicted vehicle state (e.g., change in steering rack position) output by the vehicle model 804 may be further based on various vehicle states such as clutch engagement, ABS engagement, ESC engagement, runout condition active, loss of tire pressure, etc.

Figure 9:
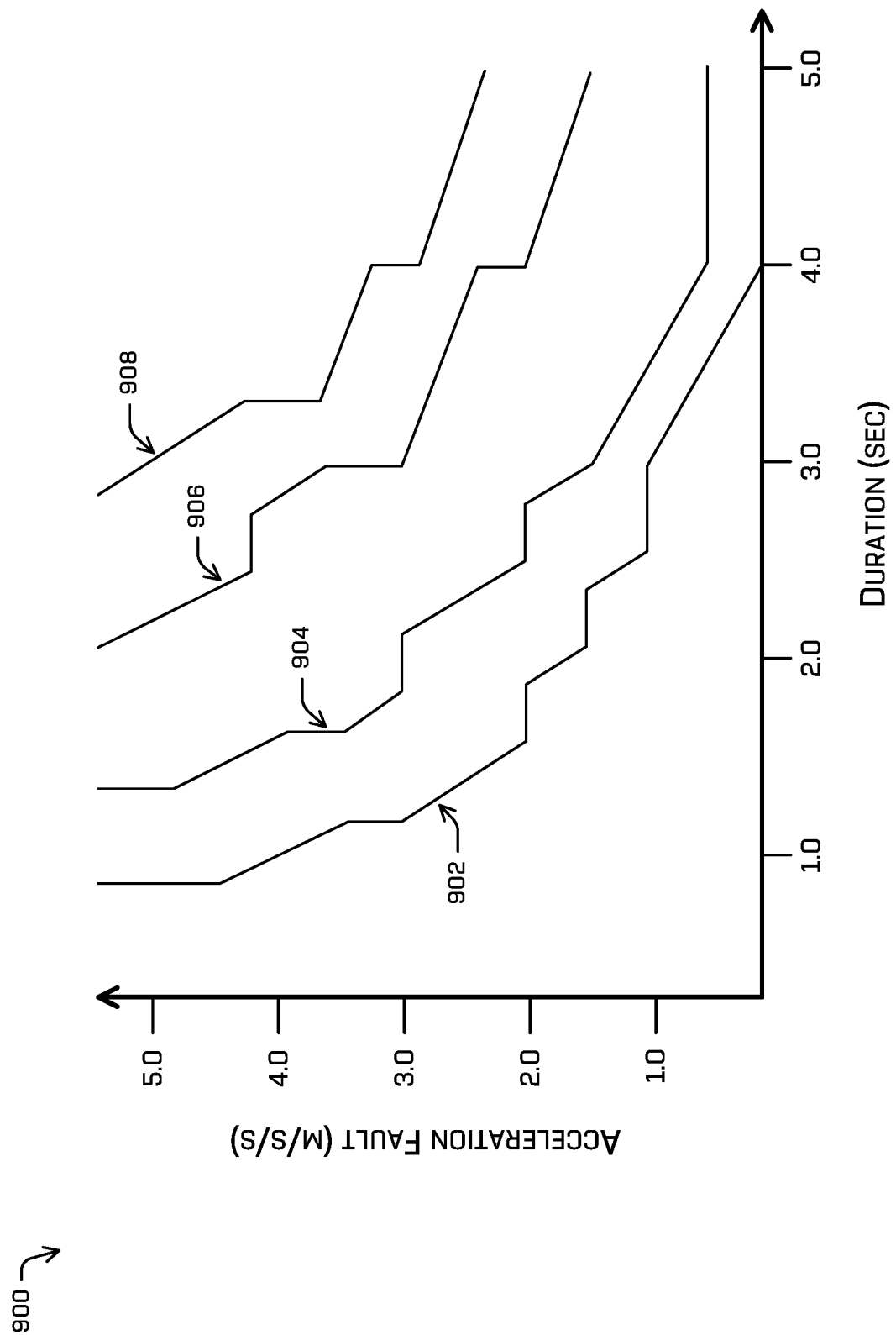
FIG. 9 illustrates a chart depicting example acceleration fault data, in accordance with one or more implementations of the disclosure.

FIG. 9 shows an example chart 900 for representing acceleration fault data associated with a vehicle. In this example, the x-axis of chart 900 represents a fault time duration (e.g., a fault tolerant time interval (FTTI)) and the y-axis of chart 900 represents a fault magnitude (e.g., faulted acceleration in m/s/s). As described above, using the various techniques herein a vehicle drive monitoring system 102 may use actuator feedback monitor(s) 108 and/or vehicle performance monitor(s) 110, individually or in combination, to determine both the magnitude of vehicle drive system faults and the duration of such faults. Using the magnitude and duration of faults, the faults may be charted within example chart 900. In some examples, charts similar or identical to the example chart 900 may correspond to risk classifications according to an automotive safety integrity level (ASIL) scheme. Chart 900 includes four different risk classifications 902, 904, 906, and 908, which progress in risk level from the lowest risk (e.g., classification 902) to the highest risk (e.g., classification 908).

Accordingly, when a vehicle drive monitoring system 102 determines fault magnitudes and durations using actuator feedback monitor(s) 108 and/or vehicle performance monitor(s) 110, it may use chart 900 to determine a risk classification level associated with the fault. In some examples, the vehicle control action initiated by the vehicle drive monitoring system 102 may be based on the risk classification level. As an example, for an acceleration fault having a magnitude and duration that exceeds classification 902 (but not classifications 904-908), the vehicle drive monitoring system 102 may select a relatively minor adjustment or remedy, such as a log update, driver notification, or bypassing a potentially faulty component for a different functioning component. However, for an acceleration fault having a magnitude and duration that exceeds classification 908, the vehicle drive monitoring system 102 may select a relatively major action, such as initiating an emergency vehicle safe stop. Further, although this example describes initiating various vehicle control actions based on the magnitude and duration of faults associated with a vehicle acceleration and/or propulsion systems, in other examples similar charts and similar techniques may be used for initiating vehicle control actions based on faults associated with braking systems, steering systems, and/or other vehicle drive system(s) 106.

Figure 10:
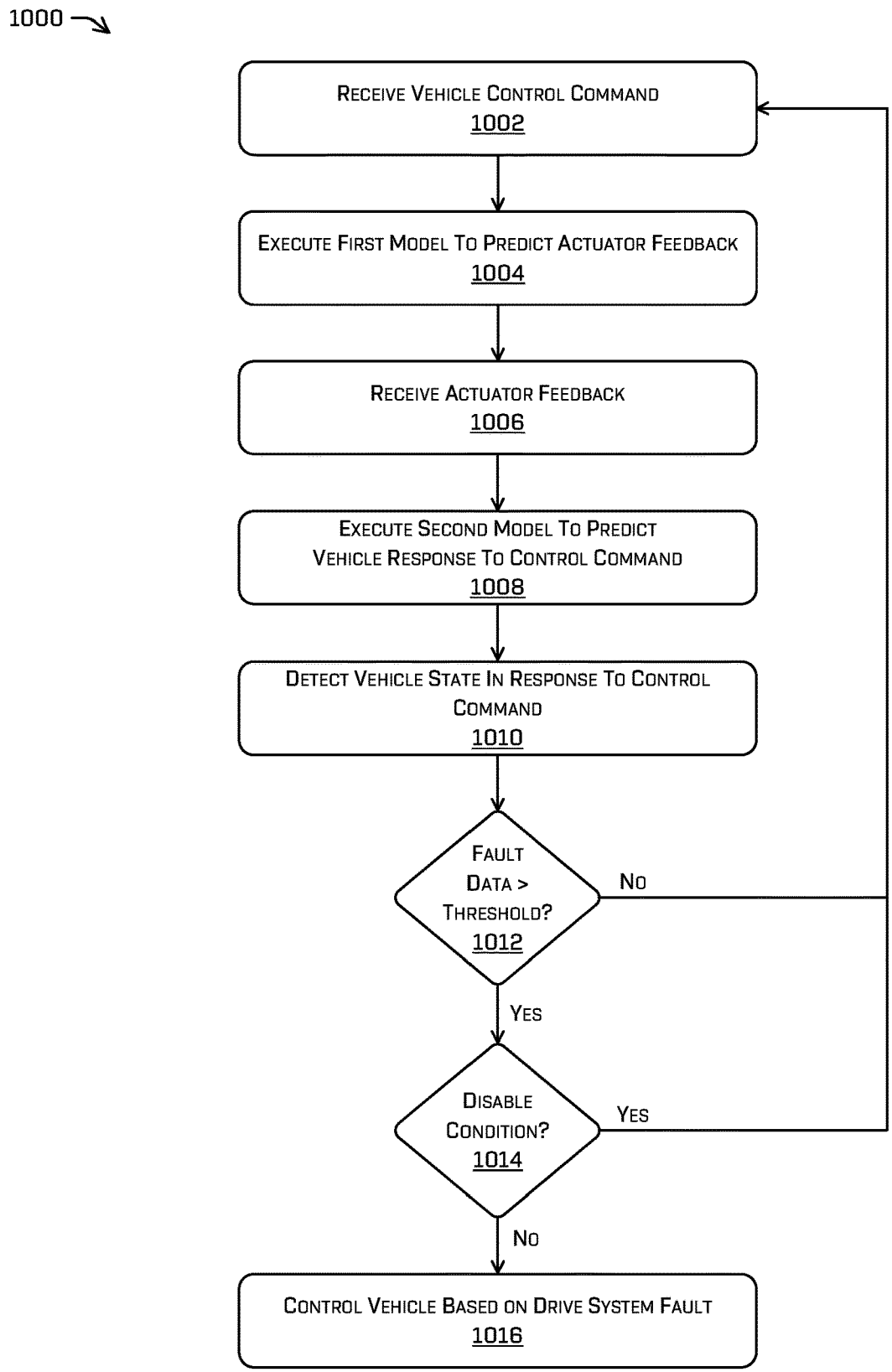
FIG. 10 is a flow diagram illustrating an example process of determining and measuring vehicle drive system faults, in accordance with one or more implementations of the disclosure.

FIG. 10 is a flow diagram illustrating an example process 1000 of determining and measuring vehicle driving system faults in accordance with the various systems and techniques discussed above. In some examples, the operations of process 1000 may be performed by one or more components of an autonomous vehicle, such a vehicle drive monitoring system 102, actuator feedback monitor(s) 108, vehicle performance monitor(s), and various other systems and components described above in reference to FIGS. 1-9.

Process 1000 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 1002, the vehicle drive monitoring system 102 may receive a vehicle control command. For example, the vehicle drive monitoring system 102 may receive a motor torque command corresponding to a vehicle acceleration request, a brake torque command corresponding to a vehicle braking request, or a steering rack position command corresponding to a vehicle braking request. The vehicle control command may correspond to a command transmitted from the vehicle system controller(s) 104 to the actuators of the vehicle drive system(s) 106.

At operation 1004, the vehicle drive monitoring system 102 may execute a first model configured to predict actuator feedback, based on the vehicle control command received in operation 1002. As described above, the vehicle drive monitoring system 102 may include one or more actuator feedback monitor(s) 108 configured to generate predicted actuator feedback values based on vehicle control commands. In various examples, the actuator feedback monitor(s) 108 may execute models including transfer functions, discrete low-pass filters, rate limiters, and/or may apply pure delays to determine a predicted actuator feedback based on the vehicle control command received at operation 1002.

At operation 1006, the vehicle drive monitoring system 102 may receive feedback data from the actuators associated with the model executed in operation 1004. In particular, the actuator feedback monitor(s) 108 within the vehicle drive monitoring system 102 may be coupled or configured to receive feedback signals from the actuators 114-118 (and/or other EDUs) within the vehicle drive system(s) 106. For instance, the drive motor actuator 114 may provide an estimated torque feedback corresponding to the amount of torque provided to the electric motor, the friction brake actuator 116 may provide an estimated torque feedback corresponding to the amount of torque provided to the hydraulic braking system, and the steering actuator 118 may provide steering rack position feedback.

At operation 1008, the vehicle drive monitoring system 102 may execute a second model configured to predict an actual vehicle state, based on the vehicle control command received in operation 1002. As described above, the vehicle drive monitoring system 102 may include one or more vehicle performance monitor(s) 110 configured to generate predicted states of the vehicle drive system(s) 106 as a whole based on the vehicle control commands. Predicted vehicle states may include, for example, predictions of vehicle accelerations, vehicle friction brake decelerations, vehicle steering changes, vehicle positions, vehicle poses, etc. As described above, the vehicle performance monitor(s) 110 may include various models and/or other components configured to execute algorithms based on the vehicle control command and other vehicle/road input data, to generate the predicted vehicle states.

At operation 1010, the vehicle drive monitoring system 102 may detect an updated vehicle state in response to the vehicle control command provided the vehicle drive system(s) in operation 1002. Detecting the measured (or actual/observed) vehicle states may include detecting and/or receiving the vehicle states data from the vehicle drive system(s) 106 or other sensor systems operating on the vehicle. Inertial measurement units (IMUs) may be used some cases to measure vehicle acceleration, deceleration, and/or yaw, at multiple times before, during, and after the vehicle control commands are provided to the drive system(s), to determine the vehicles responses to the control commands. In some examples, operations 1008 and/or 1010 may be performed in parallel with operations 1004 and/or 1006.

At operation 1212, the vehicle drive monitoring system 102 may determine whether the current vehicle drive system fault data meets or exceeds one or more associated fault threshold(s). In various examples described above, both the actuator feedback monitor(s) 108 and/or the vehicle performance monitor(s) 110 may include components configured to determine the difference between the model-based predicted data and the measured data received from the vehicle drive system(s) 106. For actuator feedback monitor(s) 108, the predicted actuator feedback determined by the various transfer functions may be compared to the actual feedback received from the actuators 114-118. For the vehicle performance monitor(s) 110, the predicted vehicle states determined by the various models may be compared to the measured vehicle state data received from IMUs and/or other sensor systems. Both the actuator feedback monitor(s) 108 and/or the vehicle performance monitor(s) 110 also may have comparison and evaluation components configured to calculate the differences between the predicted and measured/observed data and compare the differences to associated thresholds. Such thresholds may include magnitude and/or time duration thresholds, and as described above, different thresholds may be determined and maintained for different types of monitors and different vehicle subsystems (e.g., acceleration, braking, or steering). When the vehicle drive system fault data does not meet or exceed the associated fault thresholds (1012:No), process 1000 may return to operation 1002 to continue monitoring of the vehicle control commands and the corresponding vehicle drive system(s) 106.

In contrast, when the vehicle drive system fault data meets or exceeds the associated fault thresholds (1012:Yes), then at operation 1014 the vehicle drive monitoring system 102 may determine whether a disable condition is applicable to the vehicle drive system fault determined in operation 1012. As discussed above, different types of disable conditions and/or thresholds/magnitudes for disable conditions may be implemented for different types of monitors (e.g., actuator feedback or vehicle performance) and/or for different vehicle subsystems (e.g., acceleration, braking, or steering). Various specific types of disable conditions are described in the examples above. Based on the type of vehicle drive system monitor(s) used, the types of vehicle control command and vehicle subsystems used to execute the command, and/or the fault data, the vehicle drive monitoring system 102 may retrieve and evaluate the disable conditions associated with the particular fault(s). If a disable condition is satisfied by the current operational state of the vehicle (1014:Yes), then process 1000 may return to operation 1002 to continue monitoring of the vehicle control commands and the corresponding vehicle drive system(s) 106.

In contrast, when no disable condition is satisfied by the current operational state of the vehicle (1014:No), then at operation 1016 the vehicle drive monitoring system 102 may initiate one or more vehicle control actions on the vehicle. Various specific types of vehicle control actions are described in the examples above. As described above, the vehicle drive monitoring system 102 may initiate an emergency safe stop for the vehicle, based on the detection of significant faults (e.g., in magnitude and/or duration) detected within the acceleration, braking, and/or steering systems. In other examples, different vehicle control actions may be performed based on the type of drive system fault, the subsystem in which the fault is detected, and/or the magnitude and duration of the fault.

Example Clauses

A. A system comprising: one or more processors; and one or more non-transitory computer-readable media storing computer-executable instructions that, when executed, cause the system to perform operations comprising: receiving a control command for controlling an actuator of a vehicle; determining, based at least in part on a first model and the control command, a predicted actuator feedback of the actuator; receiving feedback data from the actuator within a drive system of the vehicle; determining a first difference between the feedback data and the predicted actuator feedback; determining, based at least in part on the control command and a second model, a predicted change in a state of the vehicle; determining a change in the state of the vehicle after receiving the control command; determining a second difference between the change in the state of the vehicle and the predicted change in the state; and controlling the vehicle based at least in part on the first difference and second difference.

B. The system as recited in paragraph A, wherein determining the predicted actuator feedback is based at least in part on: a communication delay; and an output from a transfer function associated with the actuator.

C. The system as recited in paragraph A, wherein controlling the vehicle comprises: causing the vehicle to initiate a stopping operation based at least in part on one or more of determining that the first difference meets or exceeds a first threshold or determining that the second difference meets or exceeds a second threshold.

D. The system as recited in paragraph A, wherein controlling the vehicle further comprises: determining, based at least in part on the second difference, a fault magnitude associated with the control command at a first time; determining, based at least in part on the first difference, a duration associated with the fault magnitude; and causing the vehicle to initiate a stopping operation is based at least in part on the fault magnitude and the duration associated with the fault magnitude.

E. The system as recited in paragraph A, the operations further comprising: determining a command type associated with the control command, wherein the command type comprises at least one of an acceleration command, a braking command, or a steering command; and determining a disable condition based at least in part on the command type, wherein controlling the vehicle is based at least in part on an evaluation of the disable condition for the vehicle.

F. A method comprising: receiving a control command for controlling an actuator of a vehicle; receiving actuator feedback data from the actuator; determining a predicted vehicle state using a vehicle state model, wherein the predicted vehicle state is based at least in part on the control command and the actuator feedback data; determining a vehicle state to the control command; determining a difference between the vehicle state and the predicted vehicle state; and controlling the vehicle based at least in part on the difference.

G. The method of paragraph F, further comprising: determining, based at least in part on the control command and an actuator feedback model, a predicted feedback associated with the actuator; and determining a second difference between the actuator feedback data and the predicted feedback, wherein controlling the vehicle is further based at least in part on the second difference.

H. The method of paragraph G, wherein controlling the vehicle further comprises: determining, based at least in part on the difference, a fault magnitude associated with the control command at a first time; determining, based at least in part on the second difference, a duration associated with the fault magnitude; and causing the vehicle to initiate a stopping operation, based at least in part on the fault magnitude and the duration associated with the fault magnitude.

I. The method of paragraph G, wherein determining the predicted feedback associated with the actuator is based at least in part on: a communication delay; and an output from a transfer function associated with the actuator.

J. The method of paragraph F, wherein the control command is an acceleration command, and wherein the method further comprises: determining a disable condition associated with the acceleration command, wherein the disable condition includes engagement of a clutch associated with the vehicle; and evaluating the disable condition for the vehicle, wherein controlling the vehicle is further based at least in part on evaluating the disable condition.

K. The method of paragraph F, wherein the control command is a braking command, and wherein the method further comprises: determining a disable condition associated with the braking command, wherein the disable condition includes engagement of at least one of an anti-lock braking system or an emergency braking system associated with the vehicle; and evaluating the disable condition for the vehicle, wherein controlling the vehicle is further based at least in part on evaluating the disable condition.

L. The method of paragraph F, wherein the control command is a steering command, and wherein the method further comprises: determining a disable condition associated with the steering command, wherein the disable condition includes engagement of an electronic stability control system associated with the vehicle; and evaluating the disable condition for the vehicle, wherein controlling the vehicle is further based at least in part on evaluating the disable condition.

M. The method of paragraph F, wherein the vehicle state model is configured to determine the predicted vehicle state based on at least one of: suspension sensor data from a suspension sensor of the vehicle; tire pressure data from a tire pressure sensor of the vehicle; or temperature data from a temperature sensor of the vehicle.

N. One or more non-transitory computer-readable media storing processor-executable instructions that, when executed by one or more processors, cause the one or more processors to perform operations comprising: receiving a control command for controlling an actuator of a vehicle; receiving actuator feedback data from the actuator; determining a predicted vehicle state using a vehicle state model, wherein the predicted vehicle state is based at least in part on the control command and the actuator feedback data; determining a vehicle state to the control command; determining a difference between the vehicle state and the predicted vehicle state; and controlling the vehicle based at least in part on the difference.

O. The one or more non-transitory computer-readable media of paragraph N, the operations further comprising: determining, based at least in part on the control command and an actuator feedback model, a predicted feedback associated with the actuator; and determining a second difference between the actuator feedback data and the predicted feedback, wherein controlling the vehicle is further based at least in part on the second difference.

P. The one or more non-transitory computer-readable media of paragraph O, wherein controlling the vehicle further comprises: determining, based at least in part on the difference, a fault magnitude associated with the control command at a first time; determining, based at least in part on the second difference, a duration associated with the fault magnitude; and causing the vehicle to initiate a stopping operation, based at least in part on the fault magnitude and the duration associated with the fault magnitude.

Q. The one or more non-transitory computer-readable media of paragraph O, wherein determining the predicted feedback associated with the actuator is based at least in part on: a communication delay; and an output from a transfer function associated with the actuator.

R. The one or more non-transitory computer-readable media of paragraph N, wherein the control command is an acceleration command, and wherein the operations further comprise: determining a disable condition associated with the acceleration command, wherein the disable condition includes engagement of a clutch associated with the vehicle; and evaluating the disable condition for the vehicle, wherein controlling the vehicle is further based at least in part on evaluating the disable condition.

S. The one or more non-transitory computer-readable media of paragraph N, wherein the control command is a braking command, and wherein the operations further comprise: determining a disable condition associated with the braking command, wherein the disable condition includes engagement of at least one of an anti-lock braking system or an emergency braking system associated with the vehicle; and evaluating the disable condition for the vehicle, wherein controlling the vehicle is further based at least in part on evaluating the disable condition.

T. The one or more non-transitory computer-readable media of paragraph N, wherein the control command is a steering command, and wherein the operations further comprise: determining a disable condition associated with the steering command, wherein the disable condition includes engagement of an electronic stability control system associated with the vehicle; and evaluating the disable condition for the vehicle, wherein controlling the vehicle is further based at least in part on evaluating the disable condition.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving a control command for controlling an actuator of a vehicle;
determining, based at least in part on a first model and the control command, a predicted actuator feedback of the actuator;
receiving actuator feedback data from the actuator within a drive system of the vehicle;
determining a duration of a drive system fault associated with the control command, based at least in part on a first difference between the actuator feedback data and the predicted actuator feedback;
determining, based at least in part on the control command and a second model, a predicted change in a state of the vehicle;
determining a change in the state of the vehicle after receiving the control command;
determining a magnitude of the drive system fault associated with the control command, based at least in part on a second difference between the change in the state of the vehicle and the predicted change in the state; and
controlling the vehicle based at least in part on the magnitude of the drive system fault and the duration of the drive system fault.

2. The system as recited in claim 1, wherein determining the predicted actuator feedback is based at least in part on:
a communication delay; and
an output from a transfer function associated with the actuator.

3. The system as recited in claim 1, wherein controlling the vehicle comprises:
causing the vehicle to initiate a stopping operation based at least in part on one or more of determining that the first difference meets or exceeds a first threshold or determining that the second difference meets or exceeds a second threshold.

4. The system as recited in claim 1, wherein controlling the vehicle further comprises:
causing the vehicle to initiate a stopping operation is based at least in part on the magnitude of the drive system fault and the duration of the drive system fault.

5. The system as recited in claim 1, the operations further comprising:
determining a command type associated with the control command, wherein the command type comprises at least one of an acceleration command, a braking command, or a steering command; and
determining a disable condition based at least in part on the command type,
wherein controlling the vehicle is based at least in part on an evaluation of the disable condition for the vehicle.

6. The system as recited in claim 1, wherein determining the duration of the drive system fault is further based at least in part on determining that the control command is a command to utilize the actuator to provide torque to a drive system motor.

7. The system as recited in claim 1, wherein determining the duration of the drive system fault is further based at least in part on determining that the control command is a stopping operation command.

8. A method comprising:
receiving a control command for controlling an actuator of a vehicle;
receiving, from the actuator, actuator feedback data associated with the control command;
determining a predicted vehicle state using a vehicle state model, wherein the predicted vehicle state is based at least in part on the control command;
determining a vehicle state after receiving the control command;
determining a magnitude of a drive system fault associated with the control command, based at least in part on a difference between the vehicle state and the predicted vehicle state;
determining a duration of the drive system fault, based at least in part on the actuator feedback data; and
controlling the vehicle based at least in part on the magnitude and the duration of the drive system fault.

9. The method of claim 8, further comprising:
determining, based at least in part on the control command and an actuator feedback model, a predicted feedback associated with the actuator; and
determining a second difference between the actuator feedback data and the predicted feedback,
wherein controlling the vehicle is further based at least in part on the second difference.

10. The method of claim 9, wherein controlling the vehicle further comprises:
causing the vehicle to initiate a stopping operation, based at least in part on the magnitude and the duration associated with the drive system fault.

11. The method of claim 9, wherein determining the predicted feedback associated with the actuator is based at least in part on:
a communication delay; and
an output from a transfer function associated with the actuator.

12. The method of claim 8, wherein the control command is an acceleration command, and wherein the method further comprises:
determining a disable condition associated with the acceleration command, wherein the disable condition includes engagement of a clutch associated with the vehicle; and
evaluating the disable condition for the vehicle, wherein controlling the vehicle is further based at least in part on evaluating the disable condition.

13. The method of claim 8, wherein the control command is a braking command, and wherein the method further comprises:
determining a disable condition associated with the braking command, wherein the disable condition includes engagement of at least one of an anti-lock braking system or an emergency braking system associated with the vehicle; and
evaluating the disable condition for the vehicle, wherein controlling the vehicle is further based at least in part on evaluating the disable condition.

14. The method of claim 8, wherein the control command is a steering command, and wherein the method further comprises:
determining a disable condition associated with the steering command, wherein the disable condition includes engagement of an electronic stability control system associated with the vehicle; and evaluating the disable condition for the vehicle, wherein controlling the vehicle is further based at least in part on evaluating the disable condition.

15. The method of claim 8, wherein the vehicle state model is configured to determine the predicted vehicle state based on at least one of:
   suspension sensor data from a suspension sensor of the vehicle;
   tire pressure data from a tire pressure sensor of the vehicle; or
   temperature data from a temperature sensor of the vehicle.

16. One or more non-transitory computer-readable media storing processor-executable instructions that, when executed by one or more processors, cause the one or more processors to perform operations comprising:
   receiving a control command for controlling an actuator of a vehicle;
   receiving, from the actuator, actuator feedback data associated with the control command;
   determining a predicted vehicle state using a vehicle state model, wherein the predicted vehicle state is based at least in part on the control command;
   determining a vehicle state after receiving the control command;
   determining a magnitude of a drive system fault associated with the control command, based at least in part on a difference between the vehicle state and the predicted vehicle state;
   determining a duration of the drive system fault, based at least in part on the actuator feedback data; and
   controlling the vehicle based at least in part on the magnitude and the duration of the drive system fault.

17. The one or more non-transitory computer-readable media of claim 16, the operations further comprising:
   determining, based at least in part on the control command and an actuator feedback model, a predicted feedback associated with the actuator; and
   determining a second difference between the actuator feedback data and the predicted feedback,
   wherein controlling the vehicle is further based at least in part on the second difference.

18. The one or more non-transitory computer-readable media of claim 17, wherein controlling the vehicle further comprises:
   causing the vehicle to initiate a stopping operation, based at least in part on the magnitude and the duration associated with the drive system fault.

19. The one or more non-transitory computer-readable media of claim 17, wherein determining the predicted feedback associated with the actuator is based at least in part on:
   a communication delay; and
   an output from a transfer function associated with the actuator.

20. The one or more non-transitory computer-readable media of claim 16, wherein the control command is an acceleration command, and wherein the operations further comprise:
   determining a disable condition associated with the acceleration command,
   wherein the disable condition includes engagement of a clutch associated with the vehicle; and
   evaluating the disable condition for the vehicle, wherein controlling the vehicle is further based at least in part on evaluating the disable condition.

* * * * *